US012163761B2

(12) United States Patent
Reed et al.

(10) Patent No.: US 12,163,761 B2
(45) **Date of Patent: *Dec. 10, 2024**

(54) MULTIDIRECTIONAL FIREARM LIGHT

(71) Applicant: Owl Gun Lights, Inc., Jacksonville, OR (US)

(72) Inventors: Talon Reed, Jacksonville, OR (US); Michael Sorensen, Talent, OR (US); Shane Reed, Jacksonville, OR (US)

(73) Assignee: Owl Gun Lights, Inc., Jacksonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,901

(22) Filed: Nov. 28, 2023

(65) Prior Publication Data

US 2024/0295383 A1 Sep. 5, 2024

Related U.S. Application Data

(63) Continuation of application No. 17/834,301, filed on Jun. 7, 2022, now Pat. No. 11,828,569, which is a (Continued)

(51) Int. Cl.

| | |
|---|---|
| ***F41G 1/35*** | (2006.01) |
| ***F21V 21/088*** | (2006.01) |
| ***F21V 23/02*** | (2006.01) |
| ***F21V 23/04*** | (2006.01) |
| ***F41G 11/00*** | (2006.01) |
| *F41A 35/06* | (2006.01) |

(52) U.S. Cl.

CPC .............. *F41G 1/35* (2013.01); *F21V 21/088* (2013.01); *F21V 23/02* (2013.01); *F21V 23/04* (2013.01); *F41G 11/004* (2013.01); *F41A 35/06* (2013.01)

(58) Field of Classification Search

CPC ..... F41G 1/00; F41G 1/32; F41G 1/34; F41G 1/35; F41G 11/004; F21V 21/088; F21V 23/04; F21V 23/02

USPC ........................... 42/114, 113, 115, 117, 146

See application file for complete search history.

(56) References Cited

U.S. PATENT DOCUMENTS 5,704,155 A * 1/1998 Primeau, IV ............ F41G 1/35 42/114

8,529,083 B1 * 9/2013 Reed ......................... F41G 1/35 362/112

(Continued)

*Primary Examiner* — Jonathan C Weber

(74) *Attorney, Agent, or Firm* — Kolitch Romano Dascenzo Gates LLC

(57) ABSTRACT

An illumination device for a firearm may include a housing supporting multiple lamps. A switch actuator of the device is rotationally coupled to a rear end of the housing. A cam is coupled to the switch actuator, such that the cam rotates with the actuator, the cam having a first end including a magnet and a second end having a shaped cam surface configured to interface with a cam follower. The actuator and the cam are biased toward a neutral position. Selective rotation of the cam causes a magnet of the cam to operate one or more magnetic switches. The cam is transitionable between a plurality of discrete positions, e.g., including a pair of toggle positions in the first rotational direction from the neutral position, and a pair of momentary positions disposed on the cam in the second rotational direction from the neutral position.

20 Claims, 15 Drawing Sheets

Related U.S. Application Data continuation of application No. 17/217,716, filed on Mar. 30, 2021, now Pat. No. 11,353,288, which is a continuation of application No. 16/746,262, filed on Jan. 17, 2020, now Pat. No. 10,962,327.

(60) Provisional application No. 62/796,395, filed on Jan. 24, 2019.

(56) References Cited

U.S. PATENT DOCUMENTS

| | | | | |
|---|---|---|---|---|
| 2007/0039226 | A1* | 2/2007 | Stokes | F41G 1/35 42/146 |
| 2015/0276347 | A1* | 10/2015 | Sharrah | F41G 1/35 42/117 |
| 2020/0200508 | A1* | 6/2020 | Teetzel | F41G 1/36 |

* cited by examiner

MULTIDIRECTIONAL FIREARM LIGHT

CROSS-REFERENCES

The following documents are hereby incorporated by reference, in their entireties, for all purposes: U.S. Provisional Patent Application Ser. No. 62/796,395, filed Jan. 24, 2019; U.S. patent application Ser. No. 17/217,716, filed Mar. 30, 2021, now U.S. Pat. No. 11,353,288; and U.S. patent application Ser. No. 17/834,301, filed Jun. 7, 2022. However, such material is only incorporated to the extent that no conflict exists between the incorporated material and the statements and drawings set forth herein. In the event of any such conflict, including any conflict in terminology, the present disclosure is controlling.

FIELD

This disclosure relates to systems and methods for a tactical multidirectional light. More specifically, the disclosed embodiments relate to a multidirectional light to be mounted to a firearm.

INTRODUCTION

In tactical and self-defense situations warranting firearm usage, proper illumination may be critical to the safety and accuracy of the firearm user. Additionally, each tactical situation may require a specific lighting configuration to ensure safety and accuracy. Quick and easy access to the proper lighting configuration for any given tactical situation may be tantamount to survival.

SUMMARY

The present disclosure provides systems, apparatuses, and methods relating to gun lights for firearms.

In some embodiments, an illumination device for a firearm may include: a housing supporting a front lamp disposed on a front end of the housing, a first side lamp disposed on a first lateral side of the housing, and a second side lamp disposed on a second lateral side of the housing; a clamp coupled to the housing and configured to mount the device to a firearm; a switch actuator rotationally coupled to a rear end of the housing, such that the actuator is manipulable in first and second rotational directions, the actuator extending transversely across a rear end of the housing; and a cam coupled to the switch actuator, such that the cam rotates with the actuator, the cam having a first end including a magnet and a second end having a shaped cam surface configured to interface with a cam follower, wherein the actuator and the cam are biased toward a neutral position; wherein the first end of the cam is adjacent a plurality of magnetic switches configured to control respective states of the front lamp and the side lamps, such that selective rotation of the cam causes the magnet of the cam to operate one or more of the magnetic switches; and wherein the shaped cam surface is configured to interact with the cam follower such that the cam is transitionable between a plurality of discrete positions including a first toggle position and a second toggle position disposed on the cam in the first rotational direction from the neutral position, and a first momentary position and a second momentary position disposed on the cam in the second rotational direction from the neutral position.

In some embodiments, a firearm assembly may include: a firearm having a mounting surface; and an illumination device coupled to the mounting surface, the illumination device comprising: a housing supporting a front lamp disposed on a front end of the housing, a first side lamp disposed on a first lateral side of the housing, and a second side lamp disposed on a second lateral side of the housing; a clamp coupled to the housing and removably securing the illumination device to the mounting surface of the firearm; a switch actuator rotationally coupled to a rear end of the housing, such that the actuator is manipulable in first and second rotational directions, the actuator extending transversely across a rear end of the housing; wherein the actuator is disposed adjacent a front end of a trigger guard of the firearm; and a cam coupled to the switch actuator, such that the cam rotates with the actuator, the cam having a first end including a magnet and a second end having a shaped cam surface configured to interface with a cam follower, wherein the actuator and the cam are biased toward a neutral position; wherein the first end of the cam is adjacent a plurality of magnetic switches configured to control respective states of the front lamp and the side lamps, such that selective rotation of the cam causes the magnet of the cam to operate one or more of the magnetic switches; wherein the shaped cam surface is configured to interact with the cam follower such that the cam is transitionable between a plurality of discrete positions including a first toggle position and a second toggle position disposed on the cam in the first rotational direction from the neutral position, and a first momentary position and a second momentary position disposed on the cam in the second rotational direction from the neutral position; and wherein the cam is configured such that transitioning between the discrete positions causes haptic feedback to the user.

Features, functions, and advantages may be achieved independently in various embodiments of the present disclosure, or may be combined in yet other embodiments, further details of which can be seen with reference to the following description and drawings.

DETAILED DESCRIPTION

Figure 1:
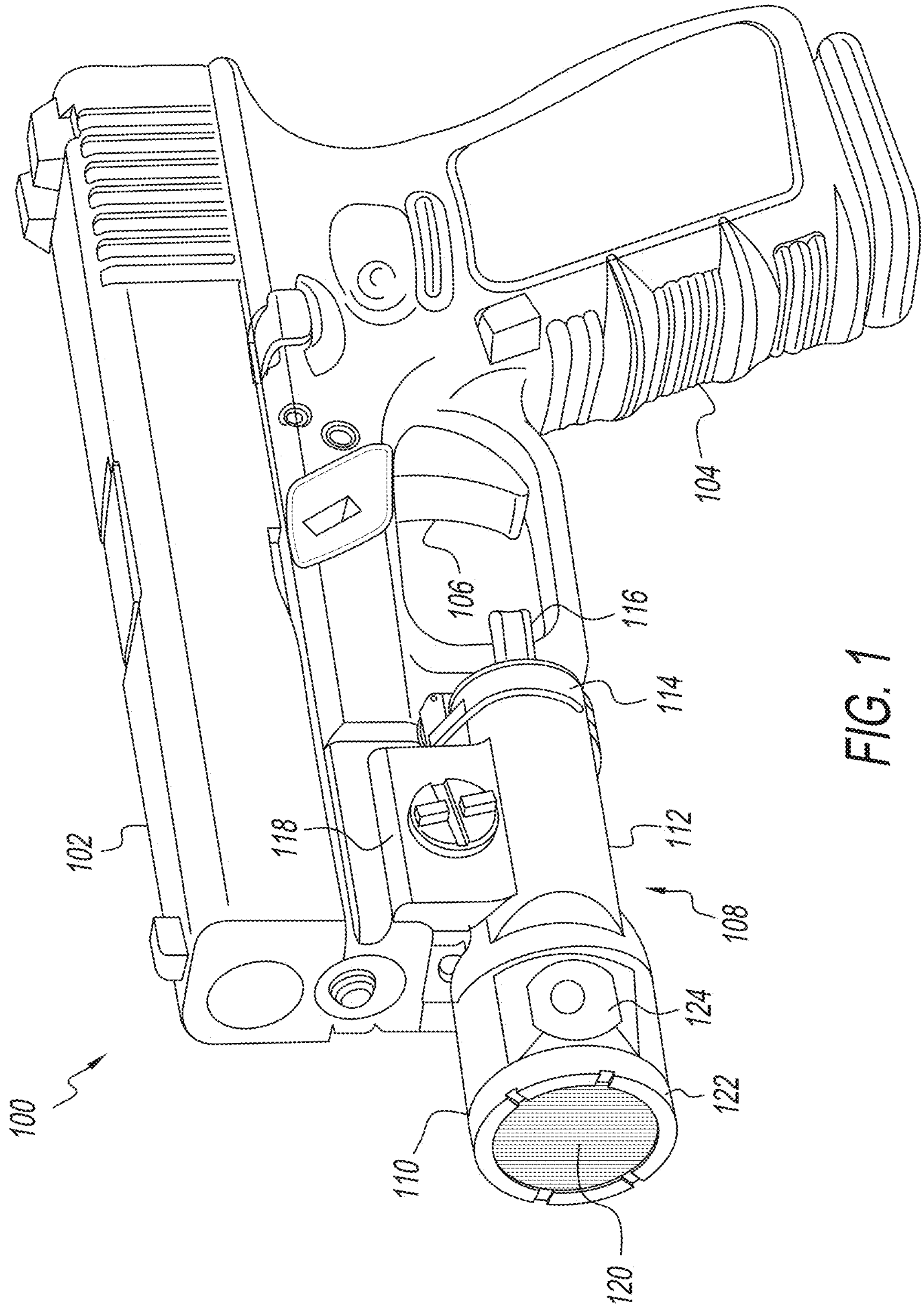
FIG. 1 is an isometric view of a handgun having a firearm light according to aspects of the present disclosure mounted beneath the barrel.

Various aspects and examples of a gun or firearm light providing a tactical advantage are described below and illustrated in the associated drawings. Unless otherwise specified, a gun light in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through D, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

Directional terms such as "up," "down," "rear," "forward," "vertical," "horizontal," and the like are intended to be understood in the context of a host firearm on which systems described herein may be mounted or otherwise attached. If applicable, the host firearm should be considered as it is held in a typical firing position, such that the barrel of the weapon is substantially horizontal. In the absence of a host firearm, the same directional terms may be used as if the firearm were present. For example, even when viewed in isolation, a component may have a "forward" edge, based on the fact that the edge in question would be installed generally facing the front portion (i.e., muzzle end) of a host firearm.

"Coupled" or "mounted" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

Overview

In general, a firearm light of the present disclosure includes a front facing light and two peripheral lights positioned on either side of the front facing light, although more or fewer lights may be included. The term "light" is utilized herein to refer to a battery-powered, portable light, lamp, or torch. Additionally, firearm lights of the present disclosure include one or more actuators configured to switch the firearm light between a plurality of (e.g., five) different positions. These positions may include a neutral position in which all lamps of the gun light are off, a first momentary position in which the front light is on, a second momentary position in which the front light and the side lights are on, a first toggle position in which the front light is on, and a second toggle position in which the front light and the side lights are on. In general, the two momentary positions are configured such that upon release of the actuator(s), the actuator and switch automatically return to the neutral position due to a biasing force provided by a biasing member. Additionally, with respect to the two toggle positions, the actuator is configured to remain in that position until the user manually returns the actuator to the neutral position and/or otherwise manually changes the position of the actuator.

The firearm light is configured to be mounted to a firearm (e.g., to a tactical rail beneath, above, or otherwise adjacent the barrel, etc.), in an orientation generally parallel to the barrel. The front light of the firearm light is configured to illuminate the area directly in front of the barrel. This configuration advantageously increases the accuracy of the user in dimly lit or unlit areas. in some examples, the front light may have an aspheric front light lens configured to increase the width of the light beam. Additionally, or alternatively, the front light lens may be substantially frustoconical. In some examples, the firearm light may include a bezel (e.g., a removable bezel) disposed at a front end of the firearm light and configured to hold the front light lens.

The side lights of the firearm light are disposed laterally, on either side of the front light, and are configured to illuminate peripheral areas adjacent the firearm. This configuration advantageously increases the accuracy and awareness of the user in dimly lit or unlit areas. The side lights may each have a reflective dish shaped formed in the shape of a truncated, skewed (i.e., slanted) cone, such that the reflective dish is configured to align and direct the light beam in a generally forward and diagonal direction.

The firearm light includes a body further including a battery cavity and a mounting bracket. The battery cavity is configured to receive one or more (e.g., rechargeable) batteries. Disposed on a first (front) end of the body is a lens sub-assembly housing the front light and side lights described above. Disposed on a second (rear) end of the body is a switch sub-assembly.

The switch sub-assembly includes the one or more actuators for switching the lights. In some examples, the actuator has a pair of manual interface elements configured to be disposed on either side of a trigger of the firearm when the firearm light is mounted under the barrel. This advantageously provides easy access to the actuator, for example, with a thumb and/or finger of the user while holding the firearm. In some examples, a biasing member (e.g., a spring, resilient member, etc.) is configured to engage the one or more actuators, causing a biasing of the actuators in a single direction. In other words, if the actuator is moved in a first direction, the biasing member is engaged and returns the actuator back to the neutral position upon release. In contrast, if the actuator is moved in a second direction, the biasing member does not engage (i.e., the actuator would not return to the neutral position unless acted on by some other force).

Movement of the actuator of the switch sub-assembly is configured to cause rotation of an internal cam. This cam has a magnet disposed on one end, an opposite end being shaped to interact with a cam follower. In some examples, the shaped opposite end includes a plurality of teeth). The cam follower is configured to mate with the shaped end (e.g., teeth) of the cam, and to selectively arrest or inhibit rotation of the cam, similar to the configuration of a ratchet and pawl. The cam and cam follower are configured to obtain one of a plurality of (e.g., five) discrete cam positions corresponding to the several lighting configurations described above.

A circuit board (e.g., a printed circuit board or PCB) is disposed proximate the cam and cam follower, the board having a plurality of magnetic switches (e.g., reed switches) disposed thereon in a selected pattern. The pattern of magnetic switches is configured such that, as the cam rotates, the magnet of the cam passes above and/or near one or more of the magnetic switches, thereby selectively activating one or more of the switches. For example, the magnetic switches may be normally open, such that, if the magnet is sufficiently close to one of the magnetic switches, the magnetic switch will close. Each magnetic switch may be configured to close a corresponding path between the power source (e.g., battery or batteries) and one or more corresponding lights (i.e., the front and/or side lights described above). Accordingly, in this example, when the magnet passes above one of the magnetic switches, that switch is closed, completing a circuit to supply power to the corresponding light(s). This switch is described below in association with an illumination device for a firearm, but the switch mechanism may also be utilized in other suitable applications and devices.

EXAMPLES, COMPONENTS, AND ALTERNATIVES

The following sections describe selected aspects of illustrative firearm lights as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Firearm Light

In FIG. 1, a firearm 100 is shown having a barrel 102, a grip 104, and a trigger 106. Mounted below barrel 102, e.g., attached to a tactical rail of the firearm, is a firearm light 108 according the present disclosure. Firearm light 108 comprises a lens sub-assembly 110, a main body 112, and a switch sub-assembly 114. Lens sub-assembly 110 includes a front light lens 120 disposed at the front of firearm light 108, a bezel 122 configured to hold front light lens 120, and a pair of side lenses 124 disposed on either side of front light lens 120. Switch sub-assembly 114 includes an actuator 116 (see FIG. 7) configured to extend laterally on both sides of trigger 106. A clamp 118 of the main body is configured to detachably mount gun light 108 to firearm 100.

Figure 2:
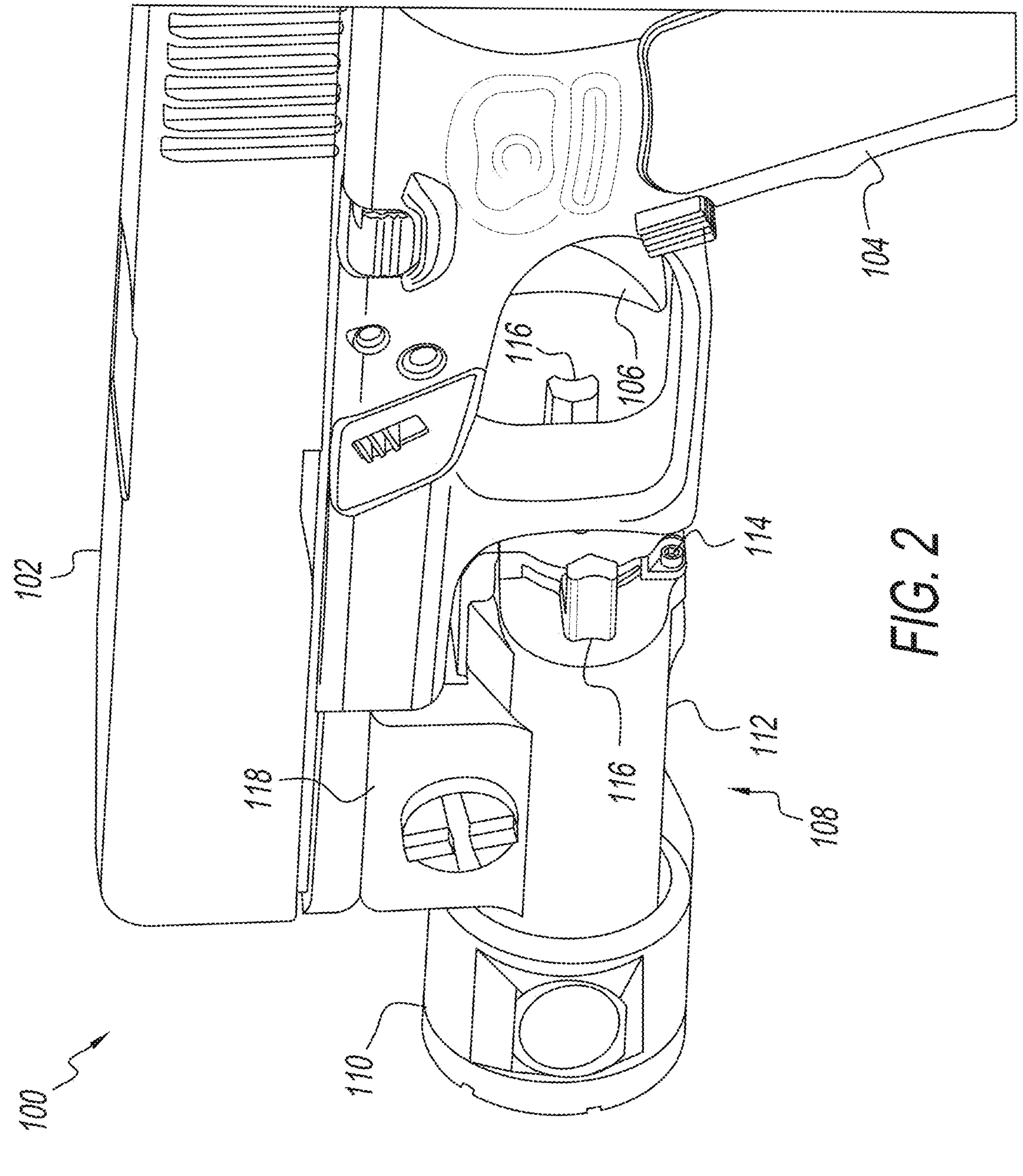
FIG. 2 is a partial isometric view of the handgun of FIG. 1, from a rear perspective, showing an actuator of the firearm light.

FIG. 2 is a rear view of firearm light 108 mounted below barrel 102. As depicted in FIG. 2, actuator 116 extends laterally on either side of a trigger guard of firearm 100. Accordingly, actuator 116 is easily accessible to a user holding firearm 100, for example by the user's thumb and/or finger. This configuration provides accessibility regardless of which hand the user is holding firearm 100 (i.e., provides accessibility for both right-handed and left-handed users). In this example, actuator 116 is a single rotating actuator having opposing arms, either of which may be manipulated to rotate the actuator as a whole. This advantageously allows firearm light 108 to be easily mounted for use by any user, without needing to reorient the actuator for user accessibility (i.e., the actuator need not be relocated to one side or the other).

Figure 3:
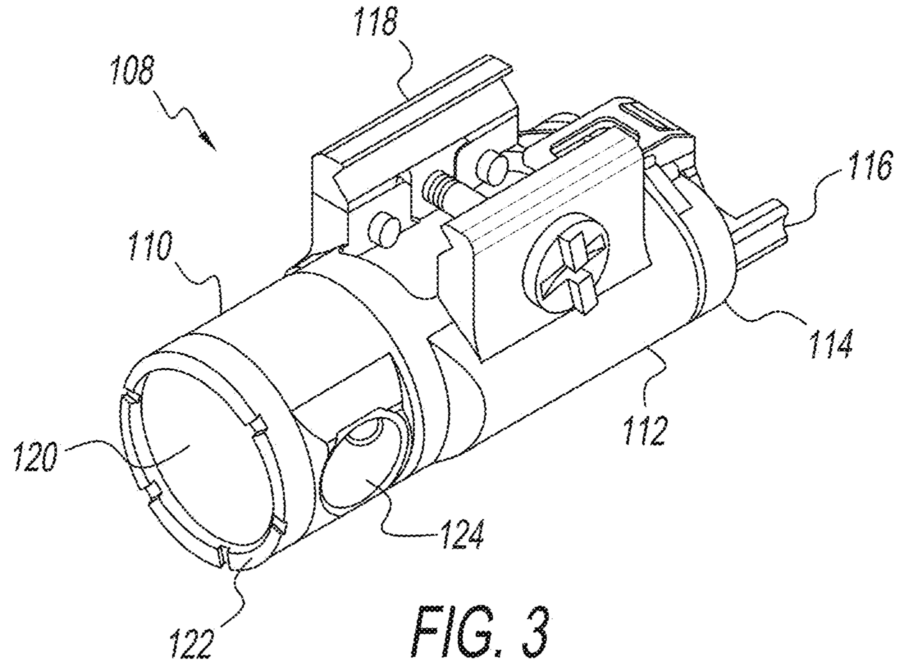
FIG. 3 is an isometric view of an illustrative firearm light according to aspects of the present disclosure.
Figure 4:
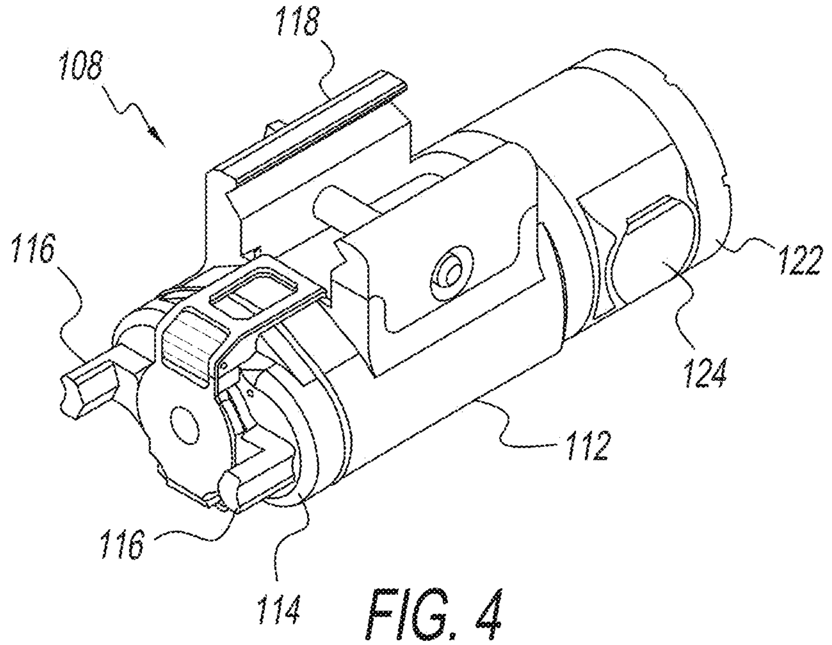
FIG. 4 is an isometric view of the firearm light of FIG. 2, from an opposing perspective.

FIGS. 3 and 4 are isometric views of firearm light 108 in an unmounted configuration with respect to firearm 100. As depicted, fixed and movable jaws of clamp 118 of firearm light 108 are held together and adjusted using a fastener (e.g., a screw), such that firearm light 108 is easily mountable to a corresponding surface of the firearm, e.g., under a firearm barrel. In the depicted examples, firearm 100 is a handgun. However, any suitable firearm may be utilized, such as a rifle, shotgun, pellet gun, paintball gun, and/or the like.

Figure 5:
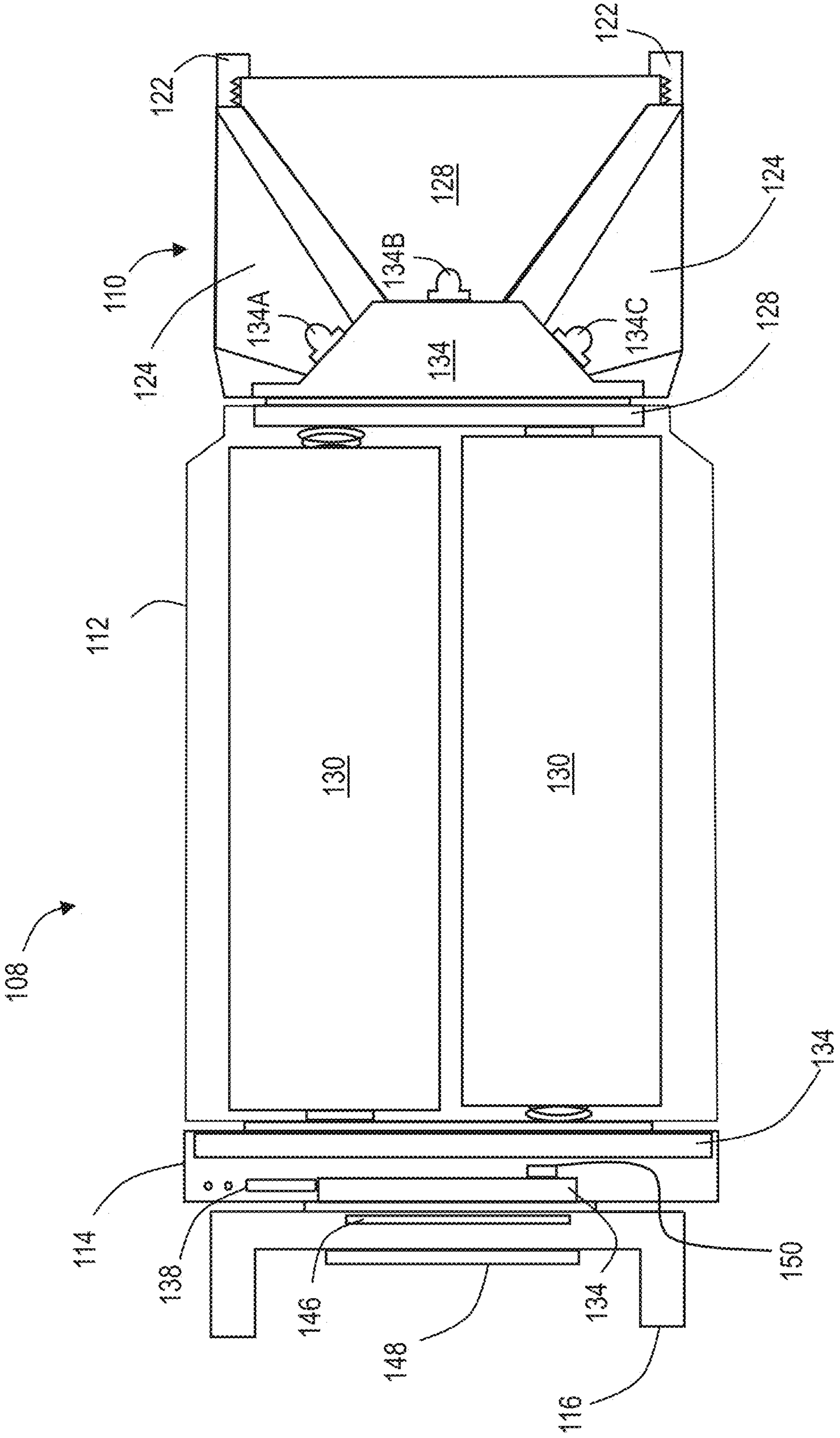
FIG. 5 is a schematic sectional view of the firearm light of FIG. 2.

FIG. 5 depicts firearm light 108 in a schematic sectional view taken generally along a horizontal centerline. Lens sub-assembly 110 includes a light source 134. Light source 134 includes a base having a plurality of lamps thereon, each of which is configured to emit light (e.g., visible light, infrared, etc.) independently when provided an electrical current. For example, light source 134 may include a plurality of light emitting diodes (LEDs) 134A, 134B, and 134C operating in the visible spectrum. In the present embodiment, three LEDs are included on light source 134, such that the front lens and two side lenses each have an associated LED. In some embodiments there may be a plurality of LEDs for each lens. In some embodiments, incandescent bulbs, Xenon bulbs, Halogen bulbs, High-intensity discharge lamps (HIDs), etc. may be utilized in addition to or in place of one or more of the LEDs.

Front lens 120 may include any suitable structure configured to amplify, reflect, and/or direct a light beam emitted by the front lamp. For example, front lens 120 may include a solid prism and/or a reflective surface. Front lens 120 may be aspherical, for example front lens may be a convex lens, a Fresnel lens, and/or the like. In some examples, front lens 120 may be substantially frustoconical. Front lens 120 may be configured to increase the width of a light beam emitted from light source 134, for example, by diverging rays of the light beam from the optical axis.

Side lenses 124 are disposed on either side of lens sub-assembly 110. Side lenses 124 are configured to direct light from light source 134 to either side of firearm light 108, providing advantageous peripheral lighting for the user. Side lenses 124 may be non-spherical, frustoconical, and/or otherwise shaped to increase the width of a light beam emitted from light source 134. As shown in FIG. 5, side lenses 124 may be configured to direct light both forward and laterally to both illuminate a peripheral area on either side of firearm light 108 and the widen the area illuminated by front lens 120. In some examples, side lenses 124 are solid or prismatic. In some examples, side lenses are hollow reflectors having planar transparent lenses disposed on external openings of the hollow reflectors. Front lens 120 and side lenses 124 may comprise glass, plastic, polycarbonate, acrylic, and/or other suitable materials.

Figure 6:
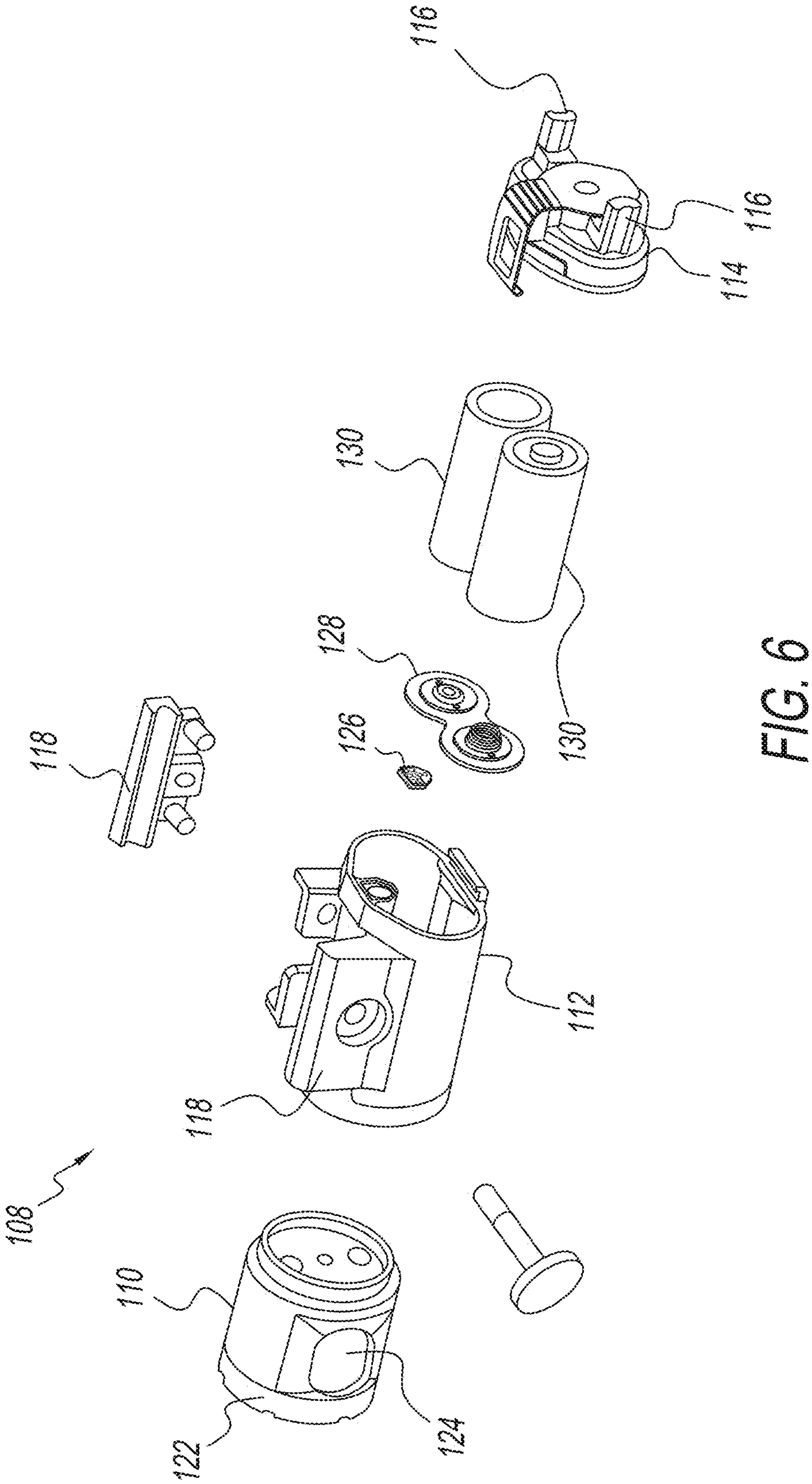
FIG. 6 is an exploded view of the firearm light of FIG. 2.

FIG. 6 depicts an exploded view of firearm light 108. Main body 112 may house a power supply for the light. In this example, main body 112 houses one or more batteries 130 and a battery control plate 126. The battery control plate is electrically coupled to battery contacts 128 (e.g., spring terminal contacts), and selectively connectable to the various lights via the switch sub-assembly. Switch sub-assembly 114 is configured to control the connection between batteries 130 and the front and side lights by selectively engaging conductive channels between batteries 130 and the front and side lights through battery control plate 126.

As shown in FIG. 6, bezel 122 is configured to fasten front lens 120 to the body of lens sub-assembly 110. Bezel 122 may include any suitable device configured to clamp the lens to the body of the firearm light. In this example, bezel 122 includes a ring having perimetric castellations (AKA crenellations and/or ridges). This advantageously allows light to escape laterally when firearm light 108 is placed bezel-down on a flat surface. The crenellated bezel may also provide a tactical advantage if firearm light 108 is utilized in the form of a blunt weapon, e.g., against an attacker.

Figure 7:
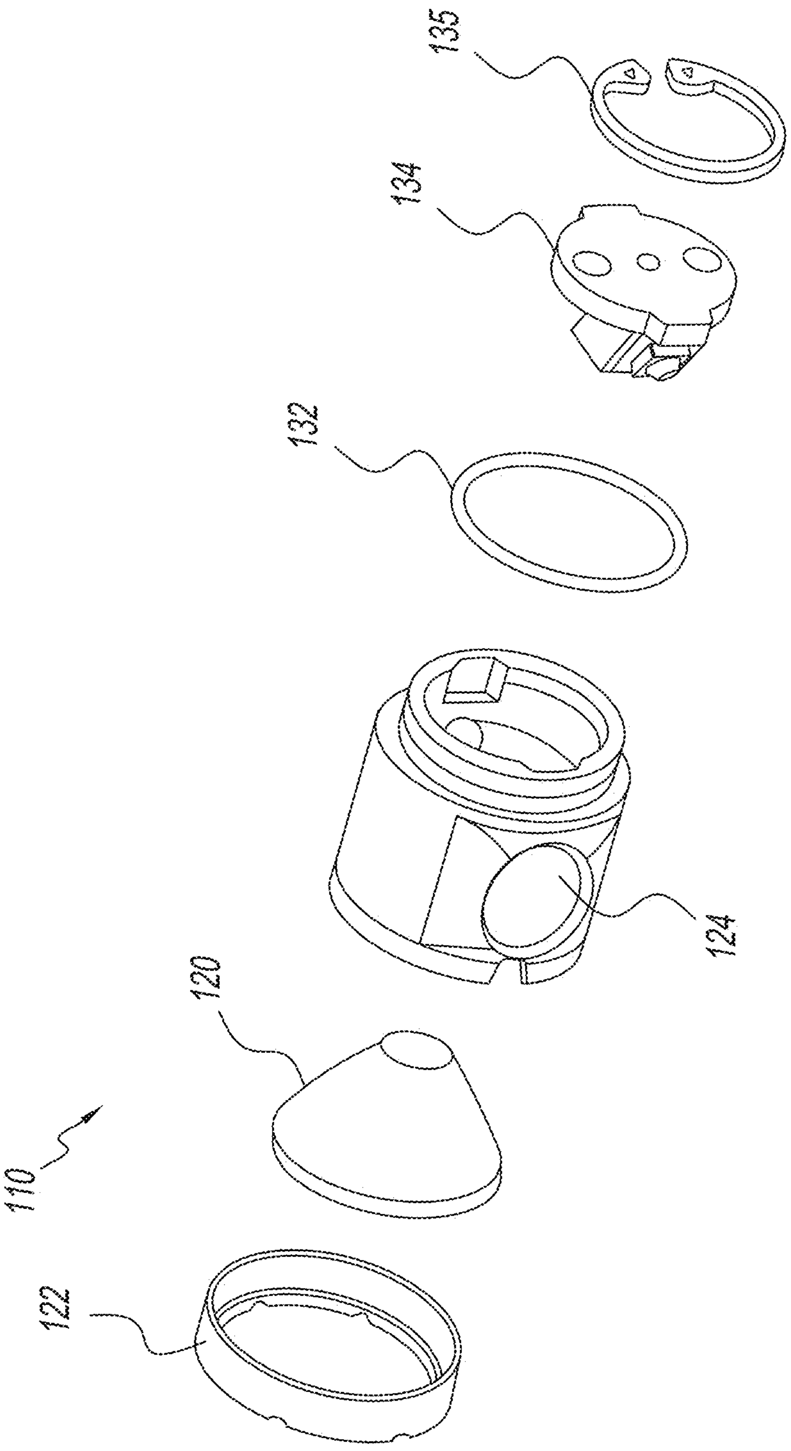
FIG. 7 is an exploded view of an illustrative lens sub-assembly suitable for use in firearm lights of the present disclosure.

FIG. 7 depicts an exploded view of lens sub-assembly 110. Light source 134 may be fastened to lens sub-assembly 110 by a C clip 135. A gasket 132 (AKA an O-ring or toric joint) is disposed between the lens sub-assembly and main body 112, such that gasket 132 is configured to seal the interface therebetween.

Figure 8:
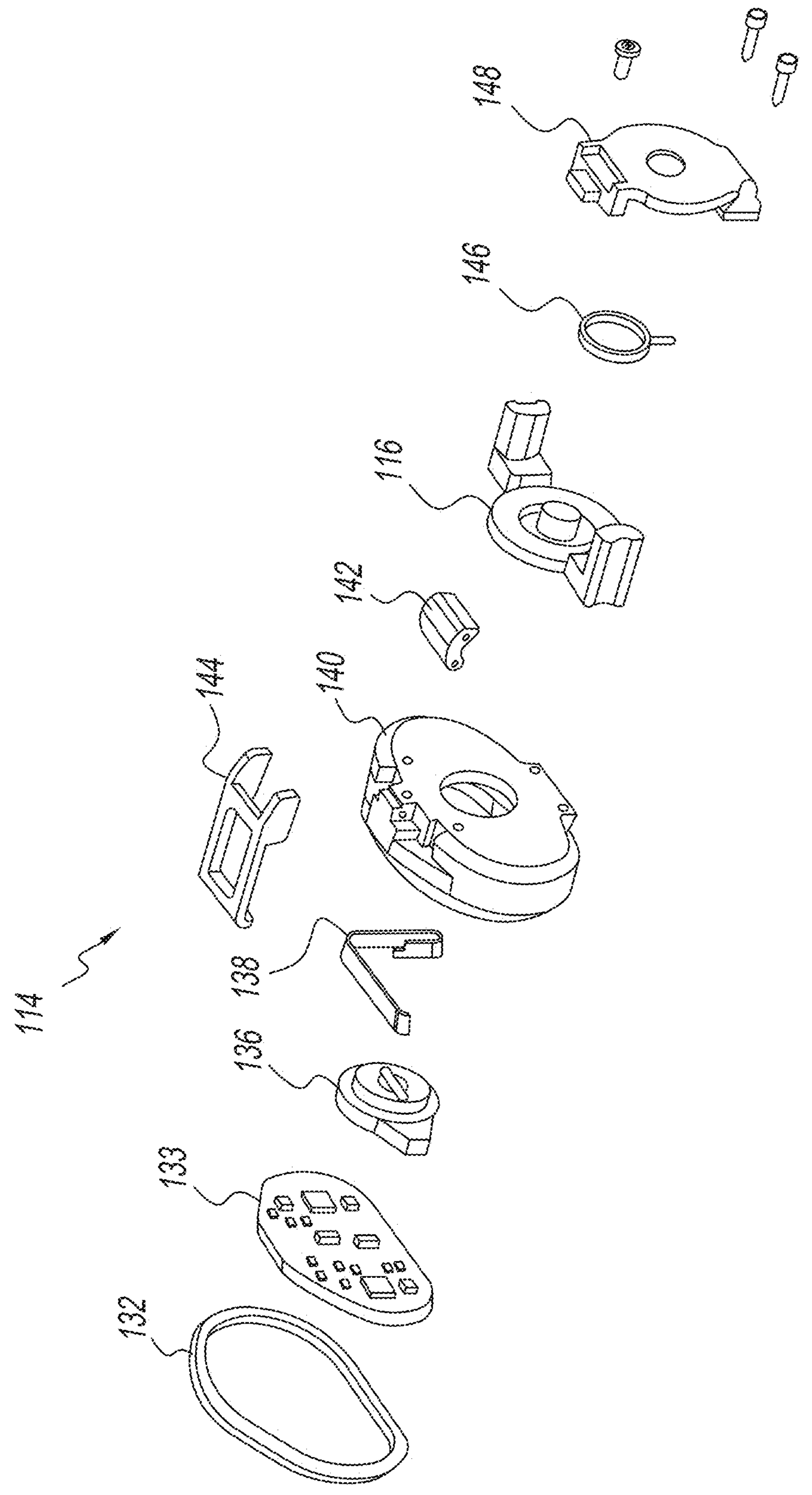
FIG. 8 is an exploded view of a first illustrative switch sub-assembly suitable for use in firearm lights of the present disclosure.

FIG. 8 depicts and an exploded view of switch sub-assembly 114, including a gasket 132, a printed circuit board 133 (PCB), cam 136, and cam follower 138. Cam 136 and cam follower 138 (and corresponding components in other embodiments) may be referred to as (and function as) a detent mechanism. Actuator 116 is disposed on the rear side of assembly housing 140 and attached to assembly housing by a mounting plate 148. Actuator 116 is coupled with cam 136 through an opening in the center of assembly housing 140 (shown in FIG. 8 as a circular cut-out in assembly housing 140). Actuator 116 and cam 136 are connected such that actuator 116 rotates cam 136 when a rotational force is applied to actuator 116 by a user. Biasing member 146 is disposed between actuator 116 and mounting plate 148 and configured to bias actuator 116 in only a single rotational direction (e.g., clockwise or counterclockwise). In the present example, biasing member 146 is a resilient device (e.g., a spring) configured to allow actuator 116 to freely rotate in a first (unbiased) direction but opposes rotation in a second (biased) direction. In other words, biasing member 146 is configured to build tension as a user rotates actuator 116 in the second direction, such that upon release by the user, actuator 116 returns to a neutral position.

Switch sub-assembly 114 includes a two-part folding clasp comprising a hooked member 144 and a linkage bar 142. The two-part folding clasp is configured to fasten lens sub-assembly 114 to main body 112.

Figure 9:
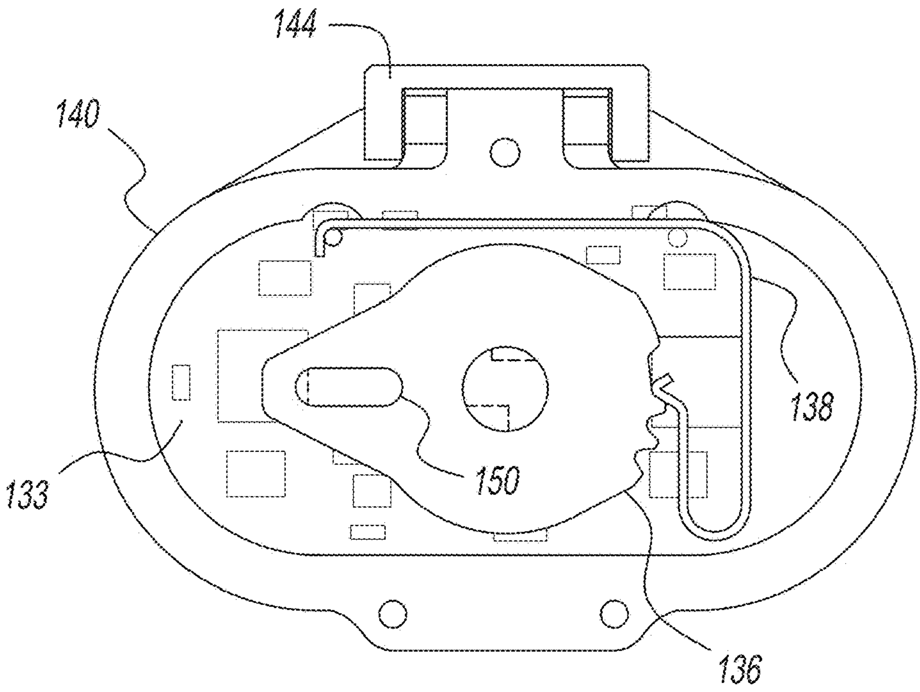
FIG. 9 is an end cutaway view of the switch sub-assembly of FIG. 8, depicting components of the switch mechanism.

As shown in the end cutaway view of FIG. 9, cam 136 has a magnet 150 disposed on one end, the opposite end being shaped to interact functionally with cam follower 138 (e.g., including a series of teeth). Cam follower 138 is configured to follow the shaped end of cam 136, thereby enabling cam 136 to be in a plurality of unique rotational positions.

An alternative embodiment of the cam and cam follower is shown in the end cutaway views of FIGS. 10-14. For purposes of explanation, other components of the switch sub-assembly are substantially as described and labeled above. In this example, a cam 236 corresponds to cam 136 and a cam follower (corresponding to cam follower 138) includes a resilient member 238A and a pawl 238B. Resilient member 238A provides a biasing force on pawl 238B such that pawl 238B maintains a mating fit with the shaped end of cam 236 (i.e., pawl 238B follows and remains in contact with the shaped end). A magnet 250 is disposed on cam 236, opposite the shaped end. Magnet 250 may be disposed on cam 236 such that magnet 250 protrudes from the front surface of cam 236. Alternatively, magnet 250 may be seated flush with cam 236.

As described above, in response to a force being applied to actuator 116 by a user, actuator 116 is configured to rotate cam 236 in the corresponding rotational direction (i.e., clockwise or counterclockwise). As cam 236 rotates, magnet 250 passes over normally open magnetic (e.g., reed) switches 152A, 152B, 152C, and 152D, selectively causing each switch to close. In the present embodiment, magnetic switches 152B and 152C are both individually configured to electrically connect the front LED of light source 134 to batteries 130. Magnetic switches 152A and 152D are both individually configured to electrically connect the side LEDs of light source 134 simultaneously to batteries 130.

Pawl 238B is configured to mate with the teeth of cam 236 such that five distinct positions are possible. Specifically, positions 154A, 154B, 154C, 154D, and 154E correspond to unique positions of cam 236 and magnet 250. In other words, positions 154A, 154B, 154C, 154D, and 154E are configured such that each position corresponds to a particular positioning of magnet 250 with respect to magnetic switches 152A, 152B, 152C, and 152D.

Figure 10:
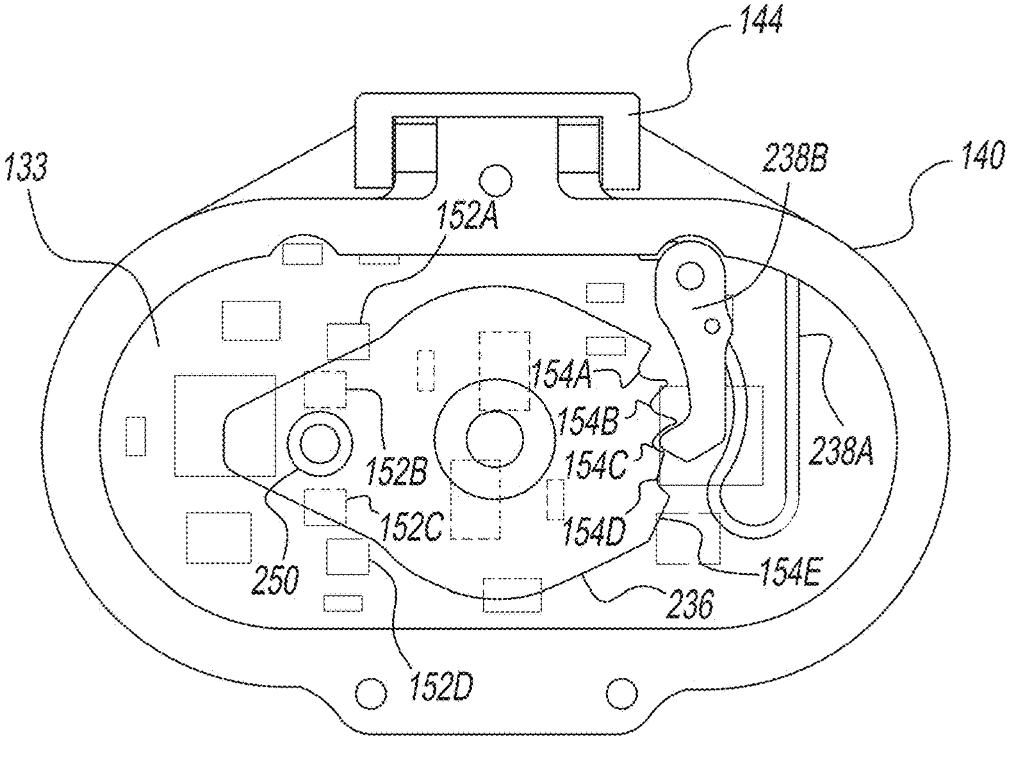
FIG. 10 is an end cutaway view of another illustrative switch sub-assembly suitable for use in firearm lights of the present disclosure, with the switch in a neutral position.

FIG. 10 depicts the neutral position of cam 236 (and therefore of actuator 116). In the neutral position, magnet 250 is disposed between magnetic switches 152B and 152C. Therefore, the magnetic switches are not influenced sufficiently enough by the magnetic field of magnet 250 to close and are therefore all open. Accordingly, none of the LEDs of light source 134 are electrically connected to batteries 130. In other words, all light-emitting features of the firearm light are in an off state. In the neutral position, pawl 238B is resting in position 154C (a bottom land of the teeth).

Figure 11:
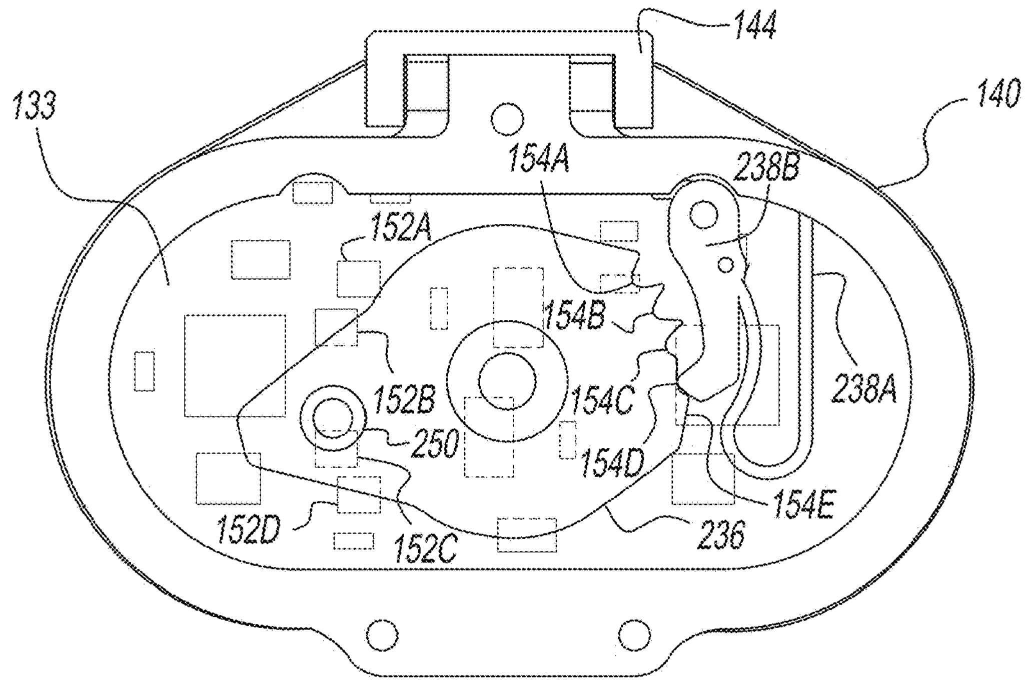
FIG. 11 depicts the switch of FIG. 9 in a first momentary position.

FIG. 11 depicts a first momentary position of cam 236 (and therefore of actuator 116). In response to actuator 116 being manipulated by the user (e.g., with a thumb) in the rotational direction corresponding to the first momentary position, cam 236 rotates such that pawl 238B overcomes the biasing force of resilient member 238A and comes to rest in position 154D. Transitioning from position 154C to position 154D includes the pawl traveling over a first convex surface between the two resting positions.

In the first momentary position, magnet 250 is located above magnetic switch 152C. The magnetic field of magnet 250 closes magnetic switch 152C and therefore electrically connects the front LED of light source 134 to batteries 130. In other words, in the first momentary position, the front light of firearm light 108 is on. Additionally, due to the force of biasing member 146, cam 236 and actuator 116 automatically return to the neutral position when the actuator is released.

Figure 12:
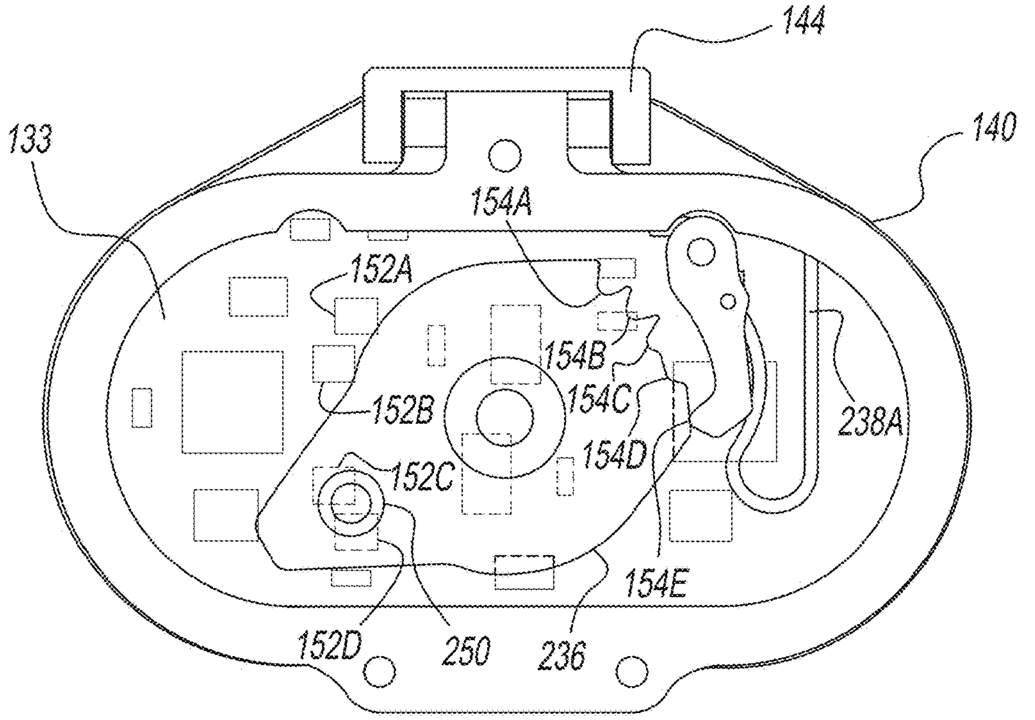
FIG. 12 depicts the switch of FIG. 9 in a second momentary position.

FIG. 12 depicts a second momentary position of cam 236 (and therefore of actuator 116). As shown, the second momentary position corresponds to pawl 238B resting in position 154E of cam 236. To transition from the first momentary position to the second momentary position, pawl 238B moves from position 154D to 154E. Transitioning from position 154D to position 154E includes the pawl traveling over a second convex surface between the two resting positions, this second convex surface being significantly larger than the first. This has the effect of a haptic or tactile indication of the position to the user through actuator 116, e.g., the user feels a "bump" through the actuator. In other words, as the user transitions actuator 116 from the first momentary position to the second momentary position, the user will feel the bump through actuator 116, thereby indicating that the new position has been reached.

In the second momentary position, magnet 250 is above magnetic switches 152C and 152D (both) and thus, the magnetic field of magnet 250 closes both of these magnetic switches. This results in the front LED and side LEDs of light source 134 being electrically connected to batteries 130. In other words, in the second momentary position, both the front light and the side lights of firearm light 108 are on (i.e., all light-emitting features of the firearm light are in an on state). Due to the force of biasing member 146, cam 236 and actuator 116 are configured to automatically return to the neutral position when the actuator is released.

Figure 13:
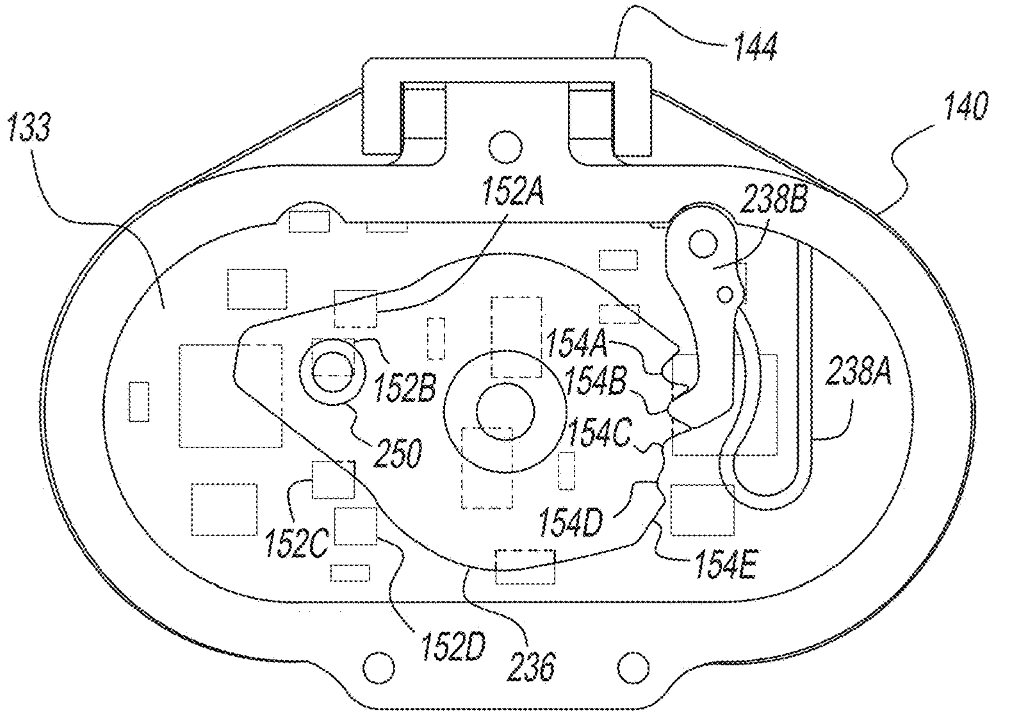
FIG. 13 depicts the switch of FIG. 9 in a first toggle position.

FIG. 13 depicts a first toggle position of cam 236 (and therefore of actuator 116). In the first toggle position, cam 236 has been rotated from the neutral position in an opposite rotational direction from the momentary positions described above. As depicted in FIG. 13, the first toggle position corresponds to pawl 238B resting in position 154B of cam 236. To transition from the neutral position to the first toggle position, pawl 238B moves from position 154C to 154B. Transitioning from position 154C to 154B includes the pawl traveling over a third convex surface between the two resting positions and coming to rest in a groove between two convex teeth. As the user transitions actuator 116 from the neutral position to the first toggle position, the user will feel the actuator "click" into place.

In the first toggle position, magnet 250 is above magnetic switch 152B. Accordingly, the magnetic field of magnet 250 closes magnetic switch 152B, thus electrically connecting the front light LED of light source 134 to batteries 130. In other words, in the first toggle position, the front light of firearm light 108 is on. Since the force of biasing member 146 is only in a single rotational direction (i.e., opposing only a rotation toward the momentary positions), cam 236 and actuator 116 remain in the first toggle position when the actuator is released and do not automatically return to the neutral position.

Figure 14:
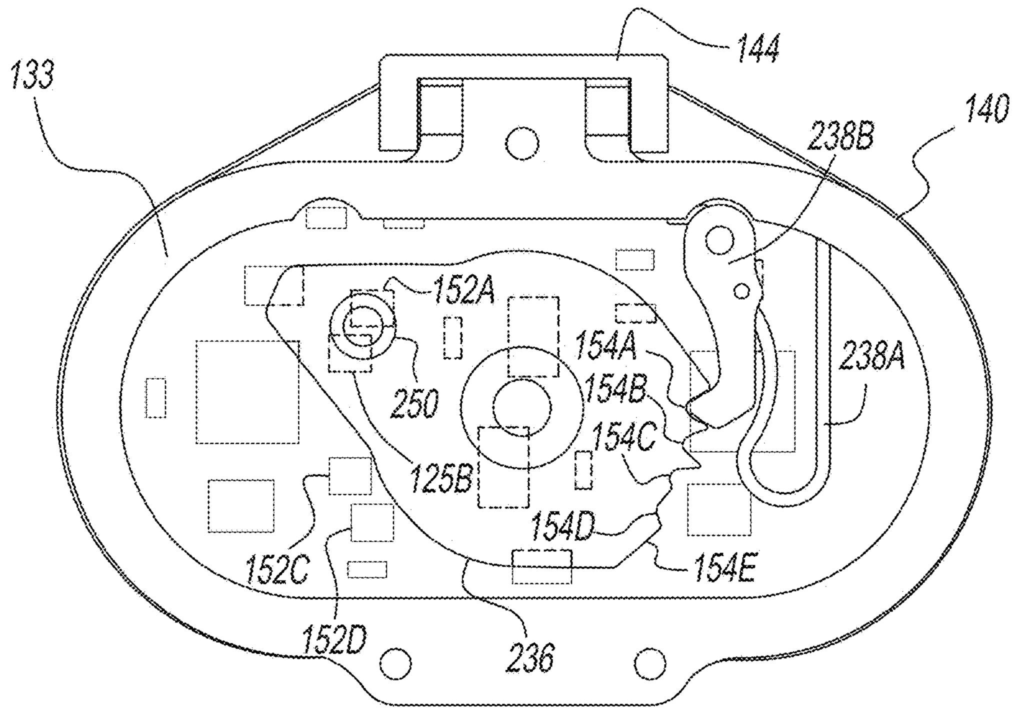
FIG. 14 depicts the switch of FIG. 9 in a second toggle position.

FIG. 14 depicts a second toggle position of cam 236 (and therefore of actuator 116). As shown, the second toggle position corresponds to pawl 238B resting in position 154A of cam 236. To transition from the first toggle position to the second toggle position, pawl 238B moves from position 154B to 154A. Transitioning from position 154B to 154A includes the pawl traveling over a fourth convex surface between the two resting positions and coming to rest in a groove between two convex teeth. As the user transitions actuator 116 from the first toggle position to the second toggle position, the user will again feel the actuator "click" into place (i.e., similar to the transition from the neutral position to the first toggle position).

In the second toggle position, magnet 250 is above magnetic switches 152A and 152B (both). Accordingly, the magnetic field of magnet 250 closes both magnetic switches, thus electrically connecting both the front light LED and side LED lights of light source 134 to batteries 130. In other words, in the second toggle position both the front light and side lights of firearm light 108 are on (i.e., all light-emitting features of the firearm light are in an on state). As with the first toggle position, cam 236 and actuator 116 remain in the first toggle position when the actuator is released and do not automatically return to the neutral position.

As described above, the two toggle positions may be selectively engaged by the user through a force applied to actuator 116. In either of the toggle positions, the user manually manipulates actuator 116 back to the neutral position to turn firearm light 108 completely off. In contrast, in either of the momentary positions, cam 236 and actuator 116 automatically return to the neutral position when the actuator is released.

B. Second Illustrative Switch Sub-Assembly

Figure 15:
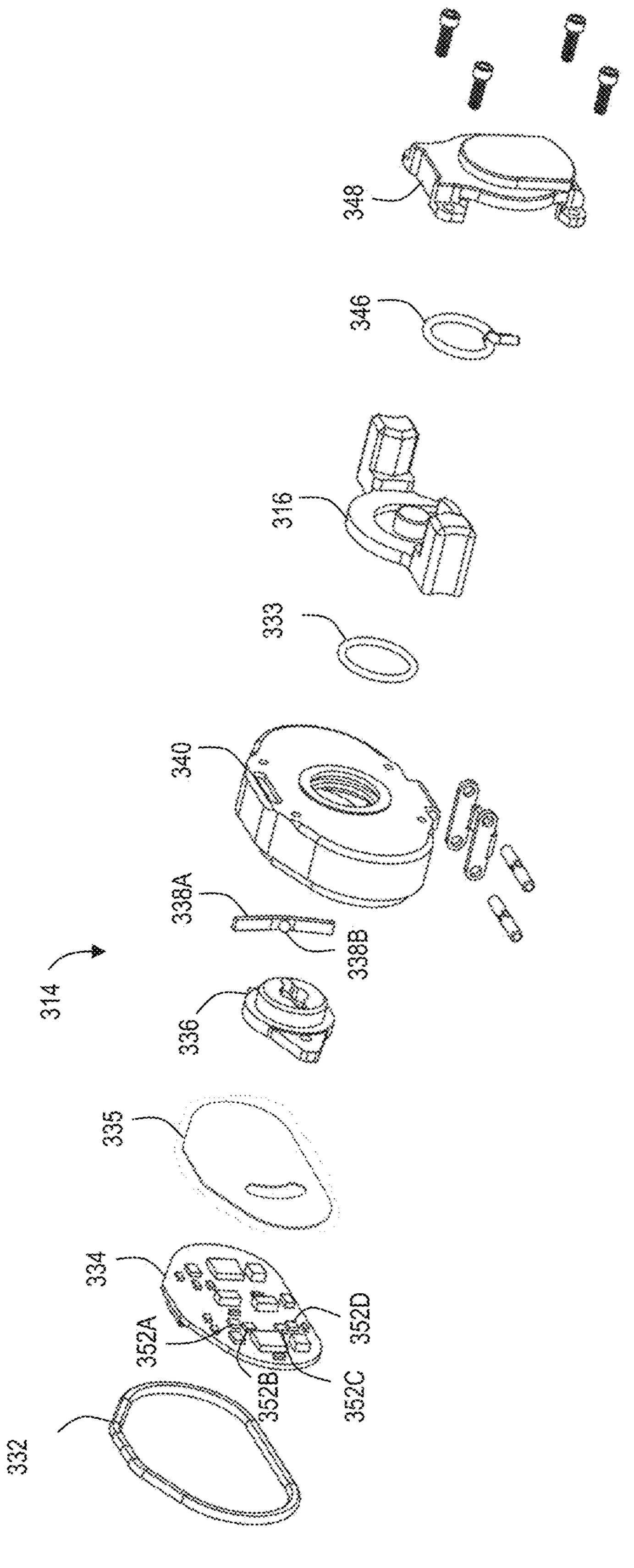
FIG. 15 is an exploded view of a second switch sub-assembly suitable for use in firearm lights of the present disclosure.

This section describes a second illustrative switch sub-assembly 314 substantially similar to subassembly 114 described above. Switch sub-assembly 314 may be incorporated into firearm light 108 in place of switch sub-assembly 114. All other components of firearm light 108 described above may be incorporated in their entirety in (or combined with) subassembly 314, unless noted otherwise in the description below. As shown in the exploded view of FIG. 15, switch sub-assembly 314 includes a first gasket 332, a second gasket 333, a printed circuit board 334 (PCB), a shield 335, a cam 336, and a cam lock having a leaf spring 338A and a ball 338B (e.g., a ball bearing). Actuator 316 is disposed on the rear side of assembly housing 340 and attached to assembly housing by a mounting plate 348. Actuator 316 is coupled to cam 336 through an opening in the center of assembly housing 340 (shown in FIG. 16 as a circular cut-out in assembly housing 340). Actuator 316 and cam 336 are connected such that actuator 316 rotates cam 336 when a rotational force is applied to actuator 316 (e.g., by a user).

As described above, a biasing member 346 is disposed between actuator 316 and mounting plate 348 and configured to bias actuator 316 in only a single rotational direction (e.g., clockwise or counterclockwise). As in subassembly 114, biasing member 346 is a resilient device (e.g., a spring) configured to allow actuator 316 to freely rotate in a first (unbiased) direction but to oppose rotation in a second (biased) direction. In other words, biasing member 346 is configured to build tension as a user rotates actuator 316 in the second direction, such that upon release by the user, actuator 316 returns to a neutral position.

Figure 16:
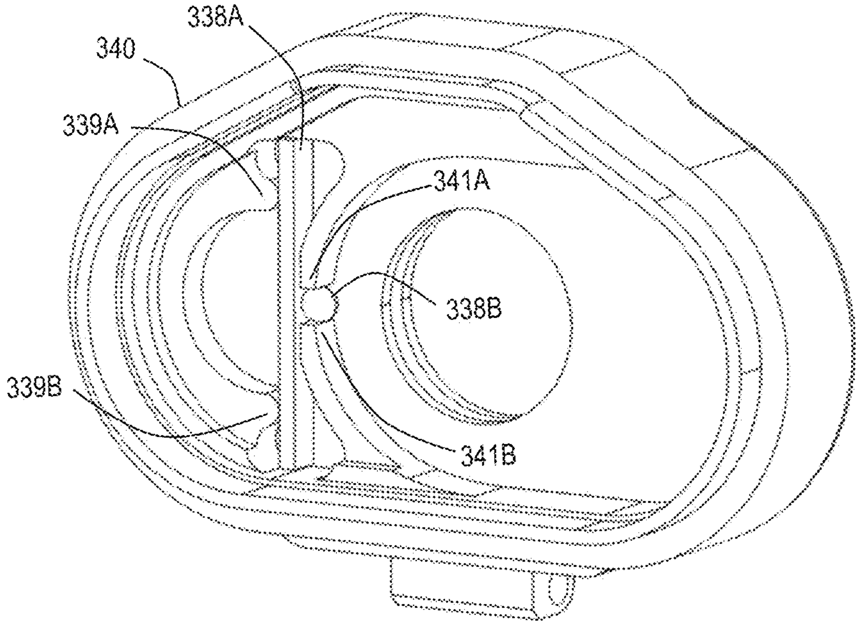
FIG. 16 is an isometric view of a portion of the switch sub-assembly of FIG. 15.

FIG. 16 depicts a front side of assembly housing 340, i.e., the side opposite actuator 316. Assembly housing 340 includes several functional shaped ridges, ribs, or contours on an interior surface, such as a first protrusion 339A and a second protrusion 339B configured to abut lateral ends of leaf spring 338A. These protrusions enable leaf spring 338A to bend as cam 336 rotates but prohibits leaf spring 338A from being displaced inside assembly housing 340. Additionally, assembly housing 340 includes a third protrusion 341A and a fourth protrusion 341B configured to abut medial portions of leaf spring 338A. In this manner, protrusions 339A, 339B, 341A, and 341B confine leaf spring 338A from translational motion within assembly housing while allowing leaf spring 338A to bend. Protrusions 341A and 341B are configured to restrict translational motion of ball 338B. In other words, ball 338B is confined in a channel formed between protrusion 341A and 341B. In general, protrusions 339A, 339B, 341A, and 341B may be formed as a single piece with assembly housing 340.

Shield 335, disposed between PCB 334 and cam 336 and described further below, provides additional confinement of ball 338B. In other words, shield 335, assembly housing 340, leaf spring 338A, and protrusions 341A and 341B all work in concert to confine ball 338B in a single region within assembly housing 340. Shield 335 may be included in subassembly 114.

Figure 17:
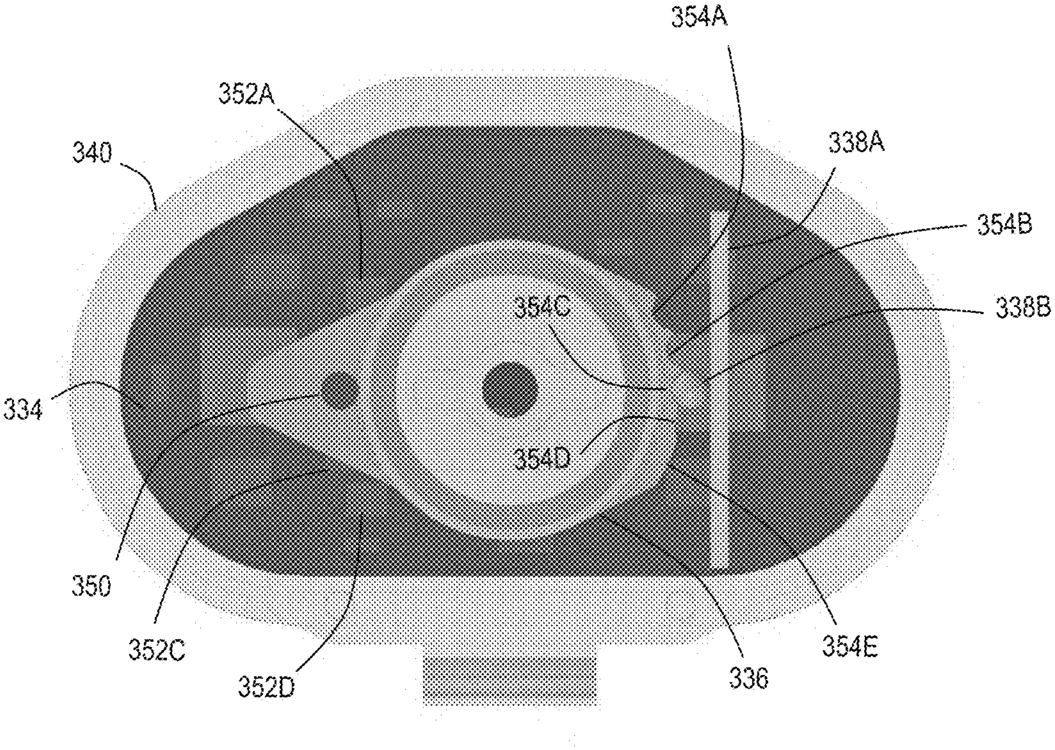
FIG. 17 is an end cutaway view of the switch sub-assembly of FIG. 15, depicting components of the switch mechanism.

As shown in the end cutaway view of FIG. 17 cam 336 has a magnet 350 disposed on one end, the opposite end being shaped to interact functionally with ball 338B of the cam lock (e.g., including a series of teeth). Magnet 350 may be disposed on cam 336 such that magnet 350 protrudes from the front surface of cam 336. Alternatively, magnet 350 may be seated flush with cam 336. Ball 338B is configured to mate with the shaped end of cam 336, thereby enabling cam 336 to be in a plurality of unique rotational positions. Leaf spring 338A provides a biasing force on ball 338B such that ball 338B maintains a mating fit with the shaped end of cam 336 (i.e., ball 338B follows and remains in contact with the shaped end).

As described above, in response to a force being applied to actuator 316 by a user, actuator 316 is configured to rotate cam 336 in the corresponding rotational direction (i.e., clockwise or counterclockwise). As described in the previous section, as cam 336 rotates, magnet 350 passes over normally open magnetic (e.g., reed) switches 352A, 352B, 352C, and 352D, selectively causing each switch to close. In the present embodiment, magnetic switches 352B and 352C are individually configured to electrically connect the front LED of light source 134 to batteries 130. Magnetic switches 352A and 352D are individually configured to electrically connect the side LEDs of light source 134 simultaneously to batteries 130.

Shield 335 includes a cutout such that, when assembled, the cutout (i.e., opening) is disposed between the path of magnet 350 and magnetic switches 352A, 352B, 352C, and 352D. In this manner, the magnetic field of magnet 350 is substantially isolated to the vicinity of the magnetic switches.

Ball 338B is configured to mate with the teeth of cam 336 such that five distinct positions are possible. Specifically, positions 354A, 354B, 354C, 354D, and 354E correspond to unique positions of cam 336 and magnet 350. In other words, positions 354A, 354B, 354C, 354D, and 354E are configured such that each position corresponds to a particular positioning of magnet 350 with respect to magnetic switches 352A, 352B, 352C, and 352D.

FIG. 17 depicts the neutral position of cam 336 (and therefore of actuator 316). In the neutral position, magnet 350 is disposed between magnetic switches 352B and 352C. Therefore, the magnetic switches are not influenced sufficiently enough by the magnetic field of magnet 350 to close and are therefore all open. Accordingly, none of the LEDs of light source 134 are electrically connected to batteries 130. In other words, all light-emitting features of the firearm light are in an off state. In the neutral position, ball 338B is resting in position 354C (a bottom land of the teeth).

Figure 18:
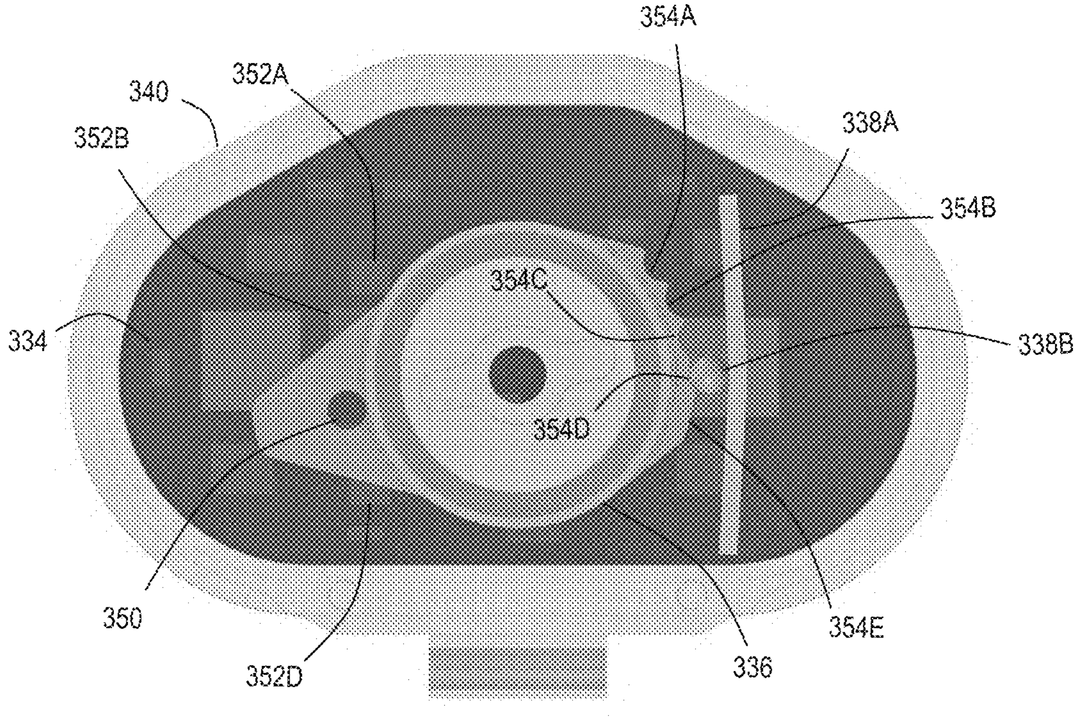
FIG. 18 depicts the switch of FIG. 17 in a first momentary position.

FIG. 18 depicts a first momentary position of cam 336 (and therefore of actuator 316). In response to actuator 316 being manipulated by the user (e.g., with a thumb) in the rotational direction corresponding to the first momentary position, cam 336 rotates such that ball 338B overcomes the biasing force of leaf spring 338A and comes to rest in position 354D. Transitioning from position 354C to position 354D includes the ball traveling over a first convex surface between the two resting positions.

In the first momentary position, magnet 350 is located above magnetic switch 352C. The magnetic field of magnet 350 closes magnetic switch 352C and therefore electrically connects the front LED of light source 134 to batteries 130. In other words, in the first momentary position, the front light of firearm light 108 is on. Additionally, due to the force of biasing member 346, cam 336 and actuator 316 automatically return to the neutral position when the actuator is released.

Figure 19:
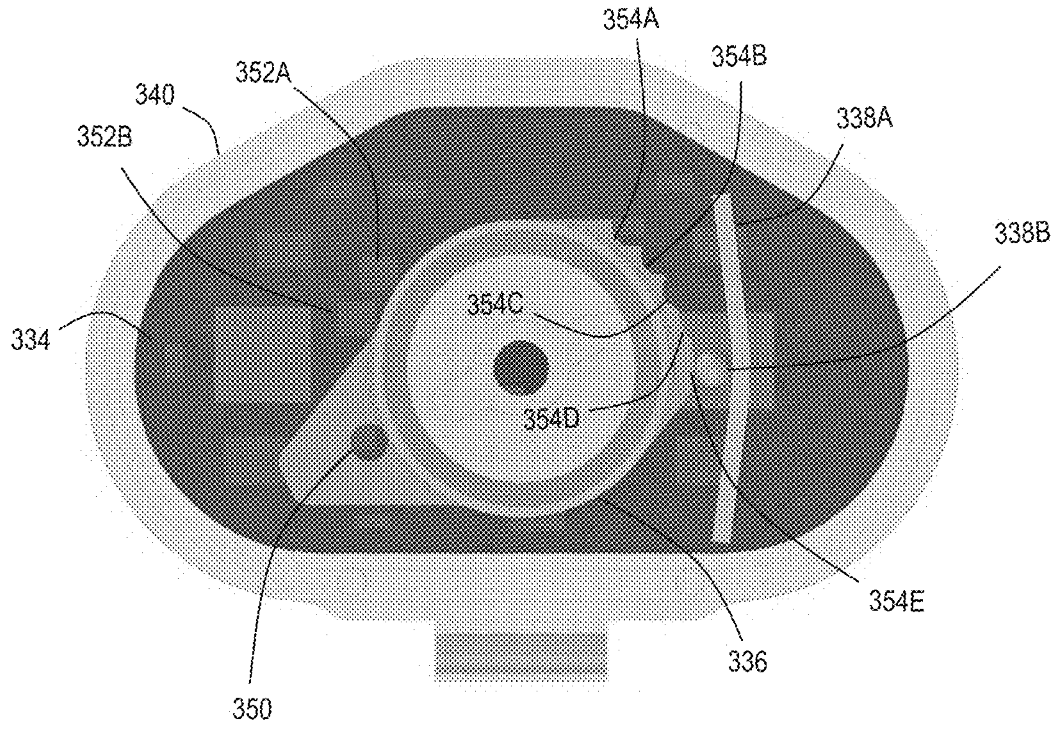
FIG. 19 depicts the switch of FIG. 17 in a second momentary position.

FIG. 19 depicts a second momentary position of cam 336 (and therefore of actuator 316). As shown, the second momentary position corresponds to ball 338B resting in position 354E of cam 336. To transition from the first momentary position to the second momentary position, ball 338B moves from position 354D to 354E. Transitioning from position 354D to position 354E includes the ball traveling over a second convex surface between the two resting positions, this second convex surface being significantly larger than the first. This has the effect of a haptic or tactile indication of the position to the user through actuator 316, e.g., the user feels a “bump” through the actuator. In other words, as the user transitions actuator 316 from the first momentary position to the second momentary position, the user will feel the bump through actuator 316, thereby indicating that the new position has been reached.

In the second momentary position, magnet 350 is above magnetic switches 352C and 352D (both) and thus, the magnetic field of magnet 350 closes both of these magnetic switches. This results in the front LED and side LEDs of light source 134 being electrically connected to batteries 130. In other words, in the second momentary position, both the front light and the side lights of firearm light 108 are on (i.e., all light-emitting features of the firearm light are in an on state). Due to the force of biasing member 346, cam 336 and actuator 316 are configured to automatically return to the neutral position when the actuator is released.

Figure 20:
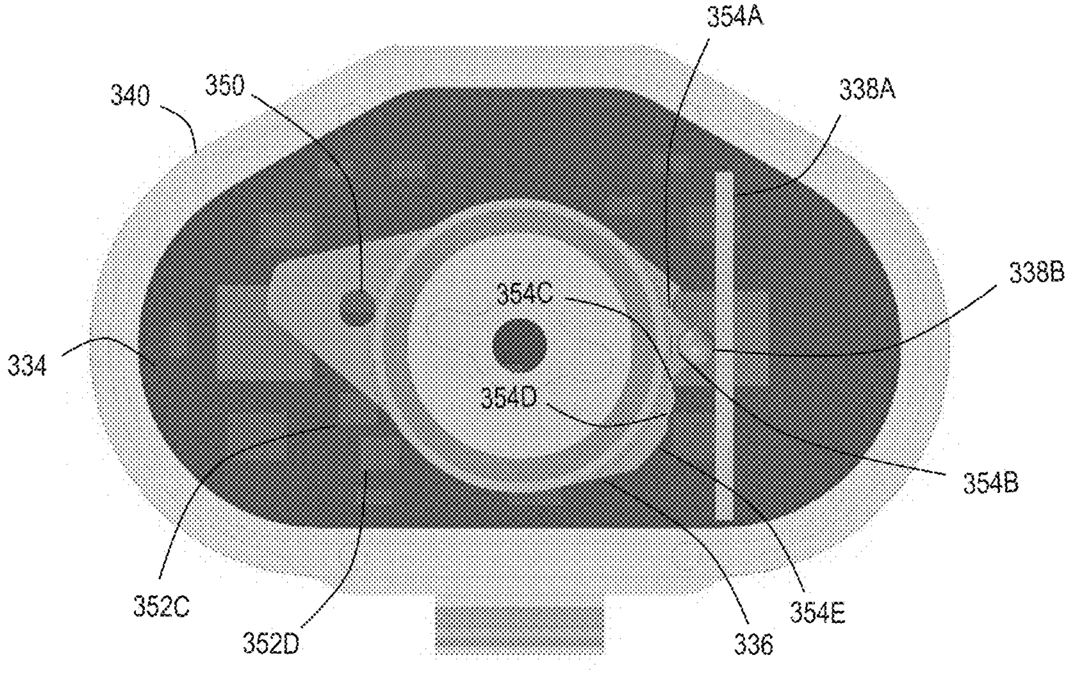
FIG. 20 depicts the switch of FIG. 17 in a first toggle position.

FIG. 20 depicts a first toggle position of cam 336 (and therefore of actuator 316). In the first toggle position, cam 336 has been rotated from the neutral position in an opposite rotational direction from the momentary positions described above. As depicted in FIG. 20, the first toggle position corresponds to ball 338B resting in position 354B of cam 336. To transition from the neutral position to the first toggle position, ball 338B moves from position 354C to 354B. Transitioning from position 354C to 354B includes the ball traveling over a third convex surface between the two resting positions and coming to rest in a groove between two convex teeth. As the user transitions actuator 316 from the neutral position to the first toggle position, the user will feel the actuator "click" into place.

In the first toggle position, magnet 350 is above magnetic switch 352B. Accordingly, the magnetic field of magnet 350 closes magnetic switch 352B, thus electrically connecting the front light LED of light source 134 to batteries 130. In other words, in the first toggle position, the front light of firearm light 108 is on. Since the force of biasing member 346 is only in a single rotational direction (i.e., opposing only a rotation toward the momentary positions), cam 336 and actuator 316 remain in the first toggle position when the actuator is released and do not automatically return to the neutral position.

Figure 21:
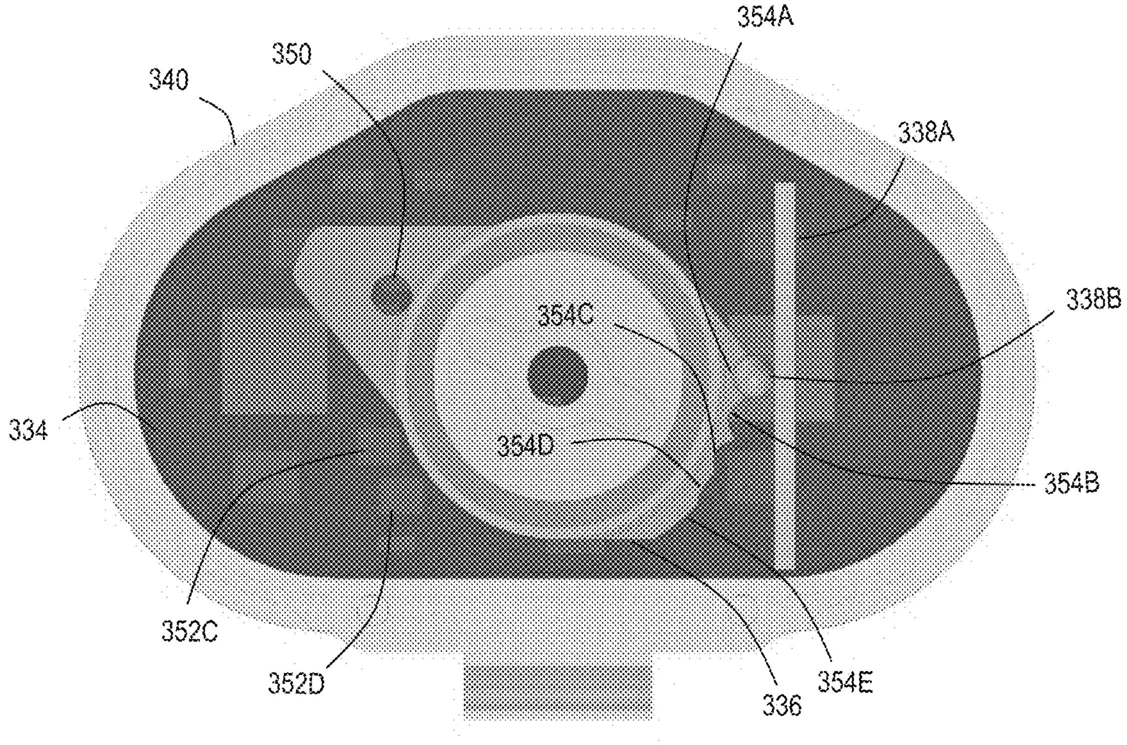
FIG. 21 depicts the switch of FIG. 17 in a second toggle position.

FIG. 21 depicts a second toggle position of cam 336 (and therefore of actuator 316). As shown, the second toggle position corresponds to ball 338B resting in position 354A of cam 336. To transition from the first toggle position to the second toggle position, ball 338B moves from position 354B to 354A. Transitioning from position 354B to 354A includes the ball traveling over a fourth convex surface between the two resting positions and coming to rest in a groove between two convex teeth. As the user transitions actuator 316 from the first toggle position to the second toggle position, the user will again feel the actuator "click" into place (i.e., similar to the transition from the neutral position to the first toggle position).

In the second toggle position, magnet 350 is above magnetic switches 352A and 352B (both). Accordingly, the magnetic field of magnet 350 closes both magnetic switches, thus electrically connecting both the front light LED and side LED lights of light source 134 to batteries 130. In other words, in the second toggle position both the front light and side lights of firearm light 108 are on (i.e., all light-emitting features of the firearm light are in an on state). As with the first toggle position, cam 336 and actuator 316 remain in the first toggle position when the actuator is released and do not automatically return to the neutral position.

As described above, the two toggle positions may be selectively engaged by the user through a force applied to actuator 316. In either of the toggle positions, the user manually manipulates actuator 316 back to the neutral position to turn firearm light 108 completely off. In contrast, in either of the momentary positions, cam 236 and actuator 316 automatically return to the neutral position when the actuator is released.

C. Illustrative Method

Figure 22:
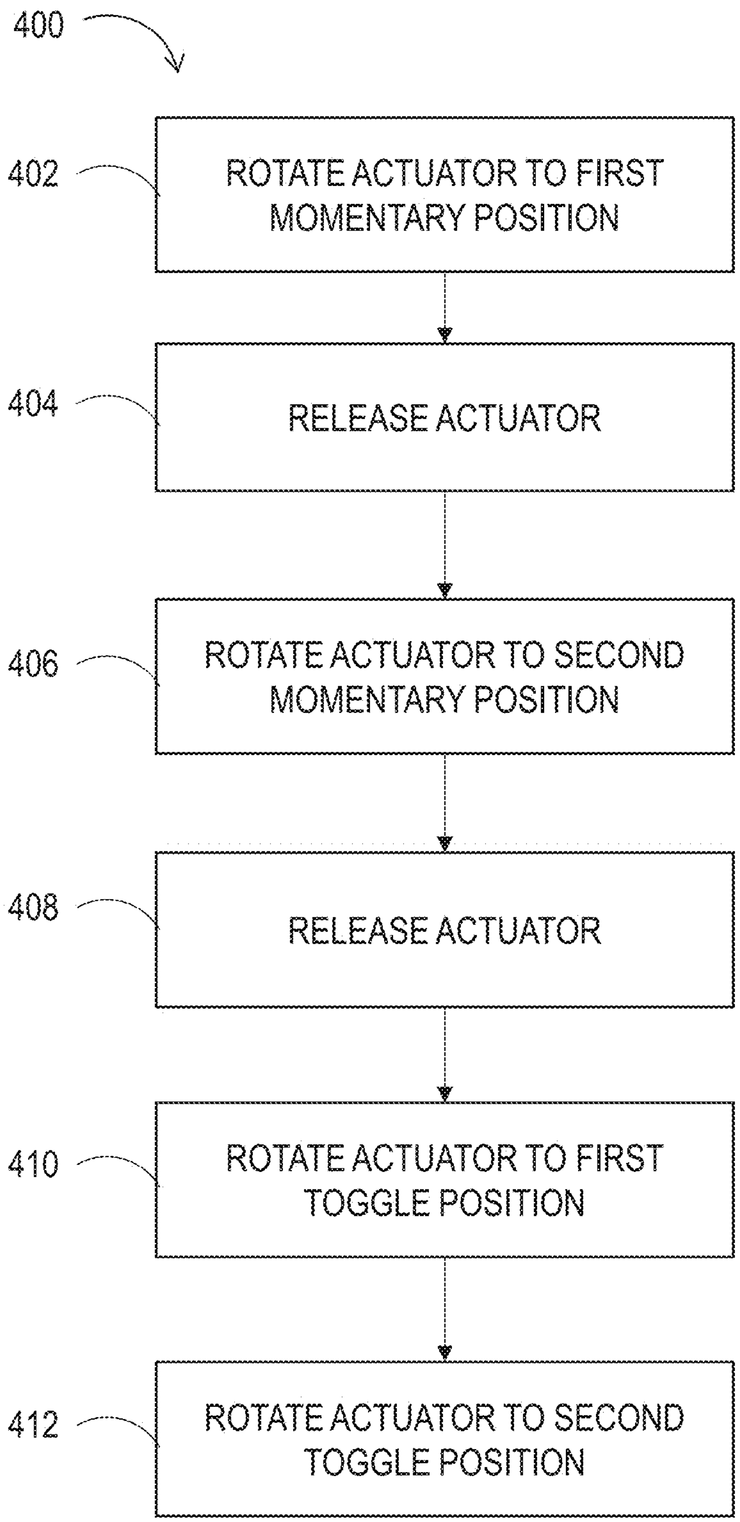
FIG. 22 is a flow chart depicting steps of an illustrative method of use of a firearm light according to aspects of the present disclosure.

This section describes steps of an illustrative method 400 of use suitable for a firearm light of the present disclosure; see FIG. 22. Aspects of firearm light 108 described above may be utilized in the method steps described below. Where appropriate, reference may be made to components and systems that may be used in carrying out each step. These references are for illustration and are not intended to limit the possible ways of carrying out any particular step of the method.

In the current example, the firearm light includes a front light, two side lights disposed on opposing sides of the firearm light, and a switch having an actuator with a neutral position, two momentary positions, and two toggle positions. Each position is substantially similar to the positions described above and, accordingly, corresponds to the lighting configurations described above. A user of the firearm may switch between the different lighting configurations by manipulating the actuator into the different positions. In the current example, the momentary positions are enabled by rotating the actuator, e.g., using a finger or thumb, in a first direction from the neutral position. The toggle positions are enabled by rotating the actuator in a second direction from the neutral position. In general, the actuator may be configured to transition to either the momentary positions or the toggle positions by pressing in any suitable direction (e.g., up, down, clockwise, counterclockwise). The current example is for illustration and is not intended to limit the direction of the positions.

FIG. 22 is a flowchart illustrating steps performed in an illustrative method, and may not recite the complete process or all steps of the method. Although various steps of method 400 are described below and depicted in FIG. 22, the steps need not necessarily all be performed, and in some cases may be performed simultaneously or in a different order than the order shown.

Step 402 of method 400 includes rotating the actuator in a first rotational direction from a neutral position to a first momentary position. In response, a front light turns on.

Step 404 of method 400 includes releasing the actuator. In response, the actuator automatically returns to the neutral position and the front light turns off.

Step 406 of method 400 includes rotating the actuator in the first rotational direction from the neutral position, through the first momentary position, to a second momentary position. In response, the front light and a pair of side lights turn on. Optionally, the user may transition the actuator directly to the second momentary position from the first momentary position of step 402, in which case the front light is already on and only the side lights turn on.

Step 408 of method 400 includes releasing the actuator. In response, the actuator automatically returns to the neutral position and the front light and side lights turns off. In some examples, this automatic return is facilitated by a biasing member, e.g., a spring.

Step 410 of method 400 includes rotating the actuator in a second rotational direction from the neutral position to a first toggle position. In response, the front light turns on. In the first toggle position, if the actuator is released, the actuator remains stationary, and does not return automatically to the neutral position. Instead, the actuator remains in the first toggle position until acted on by the user.

Step 412 of method 400 includes rotating the actuator in the second rotational direction from the first toggle position to the second toggle position. In response to transitioning to the second toggle position, the side lights turn on. In the second toggle position, if the actuator is released, the actuator remains stationary, and does not return automatically to the neutral position. Instead, the actuator remains in the second toggle position until acted on by the user.

Step 414 of method 400 includes rotating the actuator in the first rotational direction from the second toggle position to the first toggle position. In response, the side lights turn off.

Step 416 of method 400 includes rotating the actuator in the first rotational direction from the first toggle position to the neutral position. In response, the front light turns off.

D. Selected Embodiments and Claim Concepts

This section describes additional aspects and features of firearm lights, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A0. An illumination device for a firearm, the illumination device comprising:

a housing supporting a front lamp disposed on a front end of the housing, a first side lamp disposed on a first lateral side of the housing, and a second side lamp disposed on a second lateral side of the housing;

a clamp coupled to the housing and configured to mount the device to a firearm;

a switch actuator rotationally coupled to a rear end of the housing, such that the actuator is manipulable in first and second rotational directions, the actuator extending transversely across a rear end of the housing; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of the front lamp and the side lamps, such that selective rotation of the cam causes the magnet of the cam to operate one or more of the magnetic switches; and wherein the shaped cam surface is configured to interact with the cam follower such that the cam is transitionable between a plurality of discrete positions including a first toggle position and a second toggle position disposed on the cam in the first rotational direction from the neutral position, and a first momentary position and a second momentary position disposed on the cam in the second rotational direction from the neutral position.

A1. The illumination device of paragraph A0, wherein at least one of the magnetic switches is normally open.

A2. The illumination device of any one of paragraphs A0 through A1, further comprising a portable power source enclosed within the housing and configured to be electrically coupled to the front lamp via one or more of the magnetic switches.

A3. The illumination device of A2, wherein the portable power source comprises a rechargeable battery.

A4. The illumination device of any one of paragraphs A0 through A3, wherein the first toggle position is separated from the neutral position by a first tooth of the shaped cam surface.

A5. The illumination device of any one of paragraphs A0 through A4, wherein the first toggle position is separated from the second toggle position by a second tooth of the shaped cam surface.

A6. The illumination device of any one of paragraphs A0 through A5, further comprising a biasing member coupled to the actuator, such that the cam and the actuator are biased toward the neutral position from the first and second momentary positions.

A7. The illumination device of A6, wherein the biasing member comprises a coil spring, and the coil spring is configured to engage the actuator only when the actuator is rotated in the second rotational direction.

A8. The illumination device of any one of paragraphs A0 through A7, wherein the switches and the cam are configured such that the front lamp, the first side lamp, and the second side lamp are unpowered when the cam is in the neutral position.

A9. The illumination device of any one of paragraphs A0 through A8, wherein the first toggle position is configured to cause the magnetic switches to power on only the front lamp.

A10. The illumination device of any one of paragraphs A0 through A9, wherein the second toggle position is configured to cause the magnetic switches to power on the front lamp and the first and second side lamps.

A11. The illumination device of any one of paragraphs A0 through A10, wherein the first momentary position is configured to cause the magnetic switches to power on only the front lamp.

A12. The illumination device of any one of paragraphs A0 through A11, wherein the second momentary position is configured to cause the magnetic switches to power on the front lamp and the first and second side lamps.

A13. The illumination device of any one of paragraphs A0 through A12, wherein the second momentary position is separated from the first momentary position by a ramp on the shaped cam surface.

A14. The illumination device of any one of paragraphs A0 through A13, wherein the cam is configured such that transitioning between the discrete positions causes haptic feedback to the user.

B0. A firearm assembly comprising:

a firearm having a mounting surface; and an illumination device coupled to the mounting surface, the illumination device comprising:

a housing supporting a front lamp disposed on a front end of the housing, a first side lamp disposed on a first lateral side of the housing, and a second side lamp disposed on a second lateral side of the housing;

a clamp coupled to the housing and removably securing the illumination device to the mounting surface of the firearm;

a switch actuator rotationally coupled to a rear end of the housing, such that the actuator is manipulable in first and second rotational directions, the actuator extending transversely across a rear end of the housing;

wherein the actuator is disposed adjacent a front end of a trigger guard of the firearm; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of the front lamp and the side lamps, such that selective rotation of the cam causes the magnet of the cam to operate one or more of the magnetic switches;

wherein the shaped cam surface is configured to interact with the cam follower such that the cam is transitionable between a plurality of discrete positions including a first toggle position and a second toggle position disposed on the cam in the first rotational direction from the neutral position, and a first momentary position and a second momentary position disposed on the cam in the second rotational direction from the neutral position; and wherein the cam is configured such that transitioning between the discrete positions causes haptic feedback to the user.

B1. The firearm assembly of B0, wherein the first toggle position is separated from the neutral position by a first tooth of the shaped cam surface.

B2. The firearm assembly of B0 or B1, further comprising a biasing member coupled to the actuator, such that the cam and the actuator are biased toward the neutral position from the first and second momentary positions.

B3. The firearm assembly of B2, wherein the biasing member comprises a coil spring, and the coil spring is configured to engage the actuator only when the actuator is rotated in the second rotational direction.

B4. The firearm assembly of any one of paragraphs B0 through B3, wherein the switches and the cam are configured such that the front lamp, the first side lamp, and the second side lamp are unpowered when the cam is in the neutral position.

B5. The firearm assembly of any one of paragraphs B0 through B4, wherein the cam follower comprises a leaf spring and a ball.

C0. A switch for use with an electrical load, the switch comprising:

a switch actuator manipulable in first and second rotational directions; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of the electrical load, such that selective rotation of the cam causes the magnet of the cam to operate one or more of the magnetic switches; and wherein the shaped cam surface is configured to interact with the cam follower such that the cam is transitionable between a plurality of discrete positions including a first toggle position and a second toggle position disposed on the cam in the first rotational direction from the neutral position, and a first momentary position and a second momentary position disposed on the cam in the second rotational direction from the neutral position.

C1. The switch of C0, wherein at least one of the magnetic switches is normally open.

C2. The switch of C0 or C1, wherein the first toggle position is separated from the neutral position by a first tooth of the shaped cam surface.

C3. The switch of any one of paragraphs C0 through C2, wherein the first toggle position is separated from the second toggle position by a second tooth of the shaped cam surface.

C4. The switch of any one of paragraphs C0 through C3, further comprising a biasing member coupled to the actuator, such that the cam and the actuator are biased toward the neutral position from the first and second momentary positions.

C5. The switch of C4, wherein the biasing member comprises a coil spring, and the coil spring is configured to engage the actuator only when the actuator is rotated in the second rotational direction.

C6. The switch of any one of paragraphs C0 through C5, wherein the switches and the cam are configured such that the electrical load is unpowered when the cam is in the neutral position.

C7. The switch of any one of paragraphs C0 through C6, wherein the second momentary position is separated from the first momentary position by a ramp on the shaped cam surface.

C8. The switch of any one of paragraphs C0 through C7, wherein the cam is configured such that transitioning between the discrete positions by a user causes haptic feedback to the user.

C9. The switch of any one of paragraphs C0 through C8, wherein the cam follower comprises a leaf spring and a ball.

C10. An illumination device for firearms, the illumination device comprising the switch of any one of paragraphs C0 through C9.

D0. A switch for use with an electrical load, the switch comprising:

a switch actuator manipulable in first and second rotational directions; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of the electrical load, such that selective rotation of the cam causes the magnet of the cam to operate one or more of the magnetic switches; and wherein the shaped cam surface is configured to interact with the cam follower such that the cam is transitionable between a plurality of discrete positions including a toggle position disposed on the cam in the first rotational direction from the neutral position and a momentary position disposed on the cam in the second rotational direction from the neutral position.

D1. The switch of D0, wherein at least one of the magnetic switches is normally open.

D2. The switch of D0 or D1, wherein the toggle position is separated from the neutral position by a first tooth of the shaped cam surface.

D3. The switch of any one of paragraphs D0 through D2, further comprising a biasing member coupled to the actuator, such that the cam and the actuator are biased toward the neutral position from the first and second momentary positions.

D4. The switch of D3, wherein the biasing member comprises a coil spring, and the coil spring is configured to engage the actuator only when the actuator is rotated in the second rotational direction.

D5. The switch of any one of paragraphs D0 through D4, wherein the switches and the cam are configured such that the electrical load is unpowered when the cam is in the neutral position.

D6. The switch of any one of paragraphs D0 through D5, wherein the cam is configured such that transitioning between the discrete positions by a user causes haptic feedback to the user.

D7. The switch of any one of paragraphs D0 through D6, wherein the cam follower comprises a leaf spring and a ball.

D8. An illumination device for firearms, the illumination device comprising the switch of any one of paragraphs D0 through D7

E0. An illumination device for a firearm, the illumination device comprising:

a housing supporting a lamp;

a clamp coupled to the housing and configured to mount the device to a firearm;

a switch actuator rotationally coupled to a rear end of the housing, such that the actuator is manipulable in first and second rotational directions, the actuator extending transversely across a rear end of the housing; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of the lamp, such that selective rotation of the cam causes the magnet of the cam to operate one or more of the magnetic switches; and wherein the shaped cam surface is configured to interact with the cam follower such that the cam is transitionable between a plurality of discrete positions including a toggle position disposed on the cam in the first rotational direction from the neutral position, and a momentary position disposed on the cam in the second rotational direction from the neutral position.

E1. The illumination device of E0, wherein at least one of the magnetic switches is normally open.

E2. The illumination device of E0 or E1, further comprising a portable power source enclosed within the housing and configured to be electrically coupled to the lamp via one or more of the magnetic switches.

E3. The illumination device of E2, wherein the portable power source comprises a rechargeable battery.

E4. The illumination device of any one of paragraphs E0 through E3, wherein the toggle position is separated from the neutral position by a first tooth of the shaped cam surface.

E5. The illumination device of any one of paragraphs E0 through E4, further comprising a biasing member coupled to the actuator, such that the cam and the actuator are biased toward the neutral position from the momentary position.

E6. The illumination device of E5, wherein the biasing member comprises a coil spring, and the coil spring is configured to engage the actuator only when the actuator is rotated in the second rotational direction.

E7. The illumination device of any one of paragraphs E0 through E6, wherein the switches and the cam are configured such that the lamp is unpowered when the cam is in the neutral position.

E8. The illumination device of any one of paragraphs E0 through E7, wherein the toggle position is configured to cause the magnetic switches to power on the lamp.

E9. The illumination device of any one of paragraphs E0 through E8, wherein the momentary position is configured to cause the magnetic switches to power on the lamp.

E10. The illumination device of any one of paragraphs E0 through E9, wherein the cam is configured such that transitioning between the discrete positions by a user causes haptic feedback to the user.

E11. The illumination device of any one of paragraphs E0 through E10, wherein the cam follower comprises a leaf spring and a ball.

F0. A firearm assembly comprising:

a firearm having a mounting surface; and an illumination device coupled to the mounting surface, the illumination device comprising:

a housing supporting a lamp;

a clamp coupled to the housing and removably securing the illumination device to the mounting surface of the firearm;

a switch actuator rotationally coupled to a rear end of the housing, such that the actuator is manipulable in first and second rotational directions, the actuator extending transversely across a rear end of the housing;

wherein the actuator is disposed adjacent a front end of a trigger guard of the firearm; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states the lamp, such that selective rotation of the cam causes the magnet of the cam to operate one or more of the magnetic switches;

wherein the shaped cam surface is configured to interact with the cam follower such that the cam is transitionable between a plurality of discrete positions including a toggle position disposed on the cam in the first rotational direction from the neutral position, and a momentary position disposed on the cam in the second rotational direction from the neutral position.

F1. The firearm assembly of F0, wherein at least one of the magnetic switches is normally open.

F2. The firearm assembly of F0 or F1, further comprising a portable power source enclosed within the housing and configured to be electrically coupled to the lamp via one or more of the magnetic switches.

F3. The firearm assembly of F2, wherein the portable power source comprises a rechargeable battery.

F4. The firearm assembly of any one of paragraphs F0 through F3, wherein the toggle position is separated from the neutral position by a first tooth of the shaped cam surface.

F5. The firearm assembly of any one of paragraphs F0 through F4, further comprising a biasing member coupled to the actuator, such that the cam and the actuator are biased toward the neutral position from the momentary position.

F6. The firearm assembly of F5, wherein the biasing member comprises a coil spring, and the coil spring is configured to engage the actuator only when the actuator is rotated in the second rotational direction.

F7. The firearm assembly of any one of paragraphs F0 through F6, wherein the switches and the cam are configured such that the lamp is unpowered when the cam is in the neutral position.

F8. The firearm assembly of any one of paragraphs F0 through F7, wherein the toggle position is configured to cause the magnetic switches to power on the lamp.

F9. The firearm assembly of any one of paragraphs F0 through F8, wherein the momentary position is configured to cause the magnetic switches to power on the lamp.

F10. The firearm assembly of any one of paragraphs F0 through F9, wherein the cam is configured such that transitioning between the discrete positions by a user causes haptic feedback to the user.

F11. The firearm assembly of any one of paragraphs F0 through F10, wherein the cam follower comprises a leaf spring and a ball.

Advantages, Features, and Benefits

The different embodiments and examples of the firearm light described herein provide several advantages over known solutions for illuminating areas adjacent a firearm. For example, illustrative embodiments and examples described herein allow tactical advantages in quickly switching the firearm light on and off.

Additionally, and among other benefits, illustrative embodiments and examples described herein allow a user to selectively illuminate an area directly in front of the firearm and/or peripheral areas near the firearm.

Additionally, and among other benefits, illustrative embodiments and examples described herein allow a single gun light to be easily accessible to both right-handed and left-handed users.

Additionally, and among other benefits, illustrative embodiments and examples described herein allow the firearm light to have multiple momentary and toggle positions indicated by a tactile response to the user. In other words, the user is given a haptic sensation (e.g., a mechanical bump or click felt through the actuator) to assist in determining a change between switch positions. This can be very helpful to facilitate choosing among the positions and/or knowing when a position has been achieved, without needing to view the position of the actuator directly.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An accessory device for a firearm, the accessory device comprising:

a switch actuator rotationally coupled to a rear end of a housing, such that the actuator is manipulable in first and second rotational directions; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of one or more electrical loads, such that selective rotation of the cam causes the magnet of the cam to operate one or more of the magnetic switches; and wherein the shaped cam surface is configured to interact with the cam follower such that the cam is transitionable between a plurality of discrete positions including a first momentary position and a second momentary position, wherein both the first momentary position and the second momentary position are in the first rotational direction with respect to the neutral position.

2. The accessory device of claim 1, wherein at least one of the one or more magnetic switches is normally open.

3. The accessory device of claim 1, wherein the actuator and the cam are biased toward the neutral position only in response to the actuator being rotated in the second rotational direction.

4. The accessory device of claim 1, wherein the magnetic switches and the cam are configured such that the one or more electrical loads are unpowered when the cam is in the neutral position.

5. The accessory device of claim 1, wherein at least one of the momentary positions is configured to cause the magnetic switches to power on at least one of the one or more electrical loads.

6. The accessory device of claim 1, wherein the cam is configured such that transitioning between the discrete positions by a user causes haptic feedback to the user.

7. The accessory device of claim 1, wherein the cam follower comprises a leaf spring and a ball.

8. The accessory device of claim 1, further comprising a portable power source enclosed within the housing and configured to be electrically coupled to the one or electrical loads via one or more of the magnetic switches.

9. The accessory device of claim 1, wherein the first momentary position is configured to cause the magnetic switches to power on only a single one of the one or more electrical loads.

10. The accessory device of claim 1, wherein the second momentary position is separated from the first momentary position by a ramp on the shaped cam surface.

11. A firearm assembly comprising:

a firearm having a mounting surface; and an accessory device coupled to the mounting surface, the accessory device comprising:

a switch actuator rotationally coupled to a rear end of a housing, such that the actuator is manipulable in first and second rotational directions, wherein the actuator is disposed adjacent a front end of a trigger guard of the firearm; and a cam coupled to the switch actuator, such that the cam rotates with the actuator, the cam having a first end including a magnet and a second end having a shaped cam surface configured to interface with a cam follower, wherein the actuator and the cam are biased toward a neutral position;

wherein the first end of the cam is adjacent a plurality of magnetic switches configured to control respective states of one or more electrical loads, such that selective rotation of the cam causes the magnet of the cam to operate one or more of the magnetic switches; and wherein the shaped cam surface is configured to interact with the cam follower such that the cam is transitionable between a plurality of discrete positions including a first momentary position and a second momentary position, wherein both the first momentary position and the second momentary position are in the first rotational direction with respect to the neutral position.

12. The firearm assembly of claim 11, wherein at least one of the magnetic switches is normally open.

13. The firearm assembly of claim 11, wherein the actuator and the cam are biased toward the neutral position only in response to the actuator being rotated in the second rotational direction.

14. The firearm assembly of claim 11, wherein the magnetic switches and the cam are configured such that the one or more electrical loads are unpowered when the cam is in the neutral position.

15. The firearm assembly of claim 11, wherein at least one of the momentary positions is configured to cause the magnetic switches to power on at least one of the one or more electrical loads.

16. The firearm assembly of claim 11, wherein the cam is configured such that transitioning between the discrete positions by a user causes haptic feedback to the user.

17. The firearm assembly of claim 11, wherein the cam follower comprises a leaf spring and a ball.

18. The firearm assembly of claim 11, further comprising a portable power source enclosed within the housing and configured to be electrically coupled to the one or electrical loads via one or more of the magnetic switches.

19. The firearm assembly of claim 11, wherein the first momentary position is configured to cause the magnetic switches to power on only a single one of the one or more electrical loads.

20. The firearm assembly of claim 11, wherein the second momentary position is separated from the first momentary position by a ramp on the shaped cam surface.

* * * * *